United States Patent
Nagata et al.

(10) Patent No.: US 10,064,216 B2
(45) Date of Patent: Aug. 28, 2018

(54) RADIO BASE STATION APPARATUS, MOBILE TERMINAL APPARATUS, RADIO COMMUNICATION METHOD AND RADIO COMMUNICATION SYSTEM

(75) Inventors: Satoshi Nagata, Tokyo (JP); Tetsushi Abe, Tokyo (JP); Yoshihisa Kishiyama, Tokyo (JP); Kazuaki Takeda, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 14/114,570

(22) PCT Filed: Apr. 24, 2012

(86) PCT No.: PCT/JP2012/060981
§ 371 (c)(1),
(2), (4) Date: Oct. 29, 2013

(87) PCT Pub. No.: WO2012/150686
PCT Pub. Date: Nov. 8, 2012

(65) Prior Publication Data
US 2014/0112253 A1    Apr. 24, 2014

(30) Foreign Application Priority Data
May 2, 2011    (JP) .................. 2011-103071

(51) Int. Cl.
*H04W 74/00* (2009.01)
*H04L 5/00* (2006.01)
*H04L 27/26* (2006.01)

(52) U.S. Cl.
CPC ........... *H04W 74/006* (2013.01); *H04L 5/005* (2013.01); *H04L 5/0023* (2013.01);
(Continued)

(58) Field of Classification Search
CPC ........... H04W 72/042; H04W 72/0453; H04W 72/1263; H04W 72/1278; H04W 72/1273;
(Continued)

(56) References Cited

U.S. PATENT DOCUMENTS

| 8,274,951 B2 * | 9/2012 | Liu | ................ H04L 43/045 370/332 |
| 8,442,566 B2 * | 5/2013 | Liu | ................ H04W 24/02 455/452.1 |

(Continued)

FOREIGN PATENT DOCUMENTS

| EP | 2352328 A1 * | 8/2011 | ........... H04L 5/0032 |
| JP | 2009-239537 A | 10/2009 | |

OTHER PUBLICATIONS

Jen U.S. Appl. No. 61/358,644, filed Jun 25, 2010.*
(Continued)

*Primary Examiner* — Wutchung Chu
(74) *Attorney, Agent, or Firm* — Osha Liang LLP

(57) ABSTRACT

To enable a mobile terminal apparatus to correctly demodulate a data signal in the case of applying Coordinated Multi-Point transmission (CoMP), particularly, JP-CoMP, a radio communication method of the invention is characterized in that a radio base station apparatus generates information for demodulation of a data signal in a mobile terminal apparatus in applying Coordinated Multi-Point transmission, and transmits the information for demodulation to a mobile terminal apparatus that performs Coordinated Multi-Point reception, and that the mobile terminal apparatus receives the information for demodulation of a data signal, and demodulates the data signal subjected to Coordinated Multi-Point reception using the information for demodulation.

12 Claims, 18 Drawing Sheets

(52) U.S. Cl.
CPC .......... *H04L 5/0035* (2013.01); *H04L 5/0053* (2013.01); *H04L 5/0094* (2013.01); *H04L 27/2613* (2013.01)

(58) Field of Classification Search
CPC ......... H04W 24/00; H04W 2203/0069; H04W 72/04; H04W 72/12; H04W 76/00; H04W 88/06; H04W 84/04; H04W 74/006; G06F 17/147; H04J 13/0044; H04J 13/0051; H04L 27/2613; H04L 5/0035; H04L 5/005; H04L 5/0053; H04L 5/0094
USPC ................. 370/329, 341, 252, 208, 338
See application file for complete search history.

(56) References Cited

U.S. PATENT DOCUMENTS

| | | | | |
|---|---|---|---|---|
| 8,755,365 | B2* | 6/2014 | Lee | H04W 72/1273 370/208 |
| 8,811,516 | B2* | 8/2014 | Koivisto | H04B 7/0639 375/259 |
| 8,837,396 | B2* | 9/2014 | Jongren | H04L 5/0032 370/329 |
| 8,842,616 | B2* | 9/2014 | Cheng | H04L 5/0032 370/329 |
| 8,855,056 | B2* | 10/2014 | Seo | H04B 1/74 370/328 |
| 8,908,651 | B2* | 12/2014 | Noh | H04L 1/0083 370/335 |
| 9,083,482 | B2* | 7/2015 | Noh | H04J 11/0053 |
| 9,094,145 | B2* | 7/2015 | Yue | H04W 72/042 |
| 9,148,818 | B2* | 9/2015 | Yue | H04L 5/001 |
| 9,191,159 | B2* | 11/2015 | Seo | H04L 1/1854 |
| 2010/0173660 | A1* | 7/2010 | Liu | H04W 24/02 455/501 |
| 2010/0238821 | A1* | 9/2010 | Liu | H04L 43/045 370/252 |
| 2011/0038175 | A1* | 2/2011 | Park | G02B 6/0068 362/609 |
| 2011/0038353 | A1 | 2/2011 | Miki | |
| 2011/0237270 | A1* | 9/2011 | Noh | H04B 7/0413 455/450 |
| 2011/0286376 | A1* | 11/2011 | Yoo | H04W 56/00 370/312 |
| 2011/0299449 | A1* | 12/2011 | Kwon | H04L 5/0023 370/312 |
| 2011/0317645 | A1* | 12/2011 | Jen | 370/329 |
| 2012/0002596 | A1* | 1/2012 | Kim et al. | 370/315 |
| 2012/0027110 | A1* | 2/2012 | Han | H04J 11/0079 375/260 |
| 2012/0120903 | A1* | 5/2012 | Kim et al. | 370/329 |
| 2012/0170679 | A1* | 7/2012 | Koo | H04B 7/024 375/295 |
| 2012/0176982 | A1* | 7/2012 | Zirwas | H04B 7/024 370/329 |
| 2012/0184322 | A1* | 7/2012 | Falconetti | H04W 28/18 455/524 |
| 2012/0188976 | A1* | 7/2012 | Kim | H04L 1/0025 370/329 |
| 2012/0201164 | A1* | 8/2012 | Jongren | H04L 5/0048 370/252 |
| 2012/0220327 | A1* | 8/2012 | Lee et al. | 455/509 |
| 2012/0329400 | A1* | 12/2012 | Seo | H04J 11/005 455/63.1 |
| 2013/0003788 | A1* | 1/2013 | Marinier et al. | 375/219 |
| 2013/0058307 | A1* | 3/2013 | Kim | H04B 7/024 370/329 |
| 2013/0223258 | A1* | 8/2013 | Seo et al. | 370/252 |
| 2014/0029561 | A1* | 1/2014 | Kim | H04W 72/042 370/329 |
| 2014/0036849 | A1* | 2/2014 | Ribeiro et al. | 370/329 |
| 2014/0064251 | A1* | 3/2014 | Skov et al. | 370/331 |

OTHER PUBLICATIONS

Kim et al. U.S. Appl. No. 61/234,990, filed Aug 18, 2009.*
Seo et al. U.S. Appl. No. 61/317,241, filed Mar. 24, 2010.*
Office Action in corresponding Japanese Patent Application No. 2011-103071 dated Aug. 20, 2013, with translation (4 pages).
Decision to Grant a Patent in corresponding Japanese Patent Application No. 2011-103071 dated Nov. 19, 2013, with translation (4 pages).
International Search Report for corresponding International Application No. PCT/JP2012/060981, dated May 22, 2012 (1 page).
3GPP TR 25.912 V7.1.0; "3rd Generation Partnership Project; Technical Specification Group Radio Access Network; Feasibility study for evolved Universal Terrestrial Radio Access (UTRA) and Universal Terrestrial Radio Access Network (UTRAN) (Release 7);" Sep. 2006 (57 pages).
New Postcom; "Design of PDSCH muting for CSI-RS in LTE-Advanced;" 3GPP TSG RAN WG1 Meeting #62bis, R1-105223; Xi'an, China; Oct. 11-15, 2010 (5 pages).
Extended Search Report issued in corresponding European Application No. 12779672.0, dated Sep. 29, 2014 (7 pages).
Office Action issued in corresponding Korean application No. 10-2013-7031192, dated Mar. 14, 2016 (6 pages).
Huawei; "Consideration on CSI-RS design for CoMP and text proposal to 36.814"; 3GPP TSG RAN WG1 #57bis, R1-092364; Los Angeles, USA; Jun. 29-Jul. 3, 2009 (9 pages).
Office Action issued in corresponding Chinese Patent Application No. 2012800214368 dated Oct. 9, 2016 (with translation) (18 pages).
Office Action issued in corresponding Korean Patent Application No. 10-2013-7031192 dated Oct. 25, 2016 (with translation) (5 pages).

* cited by examiner

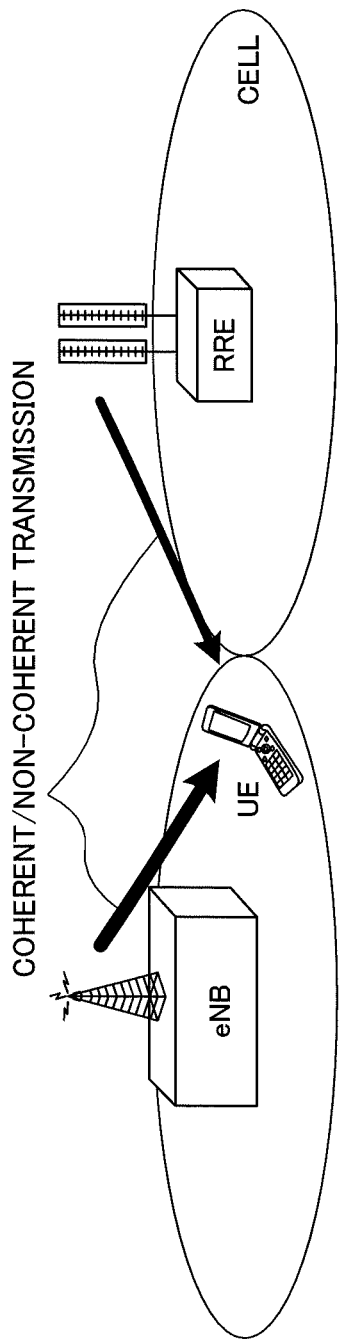
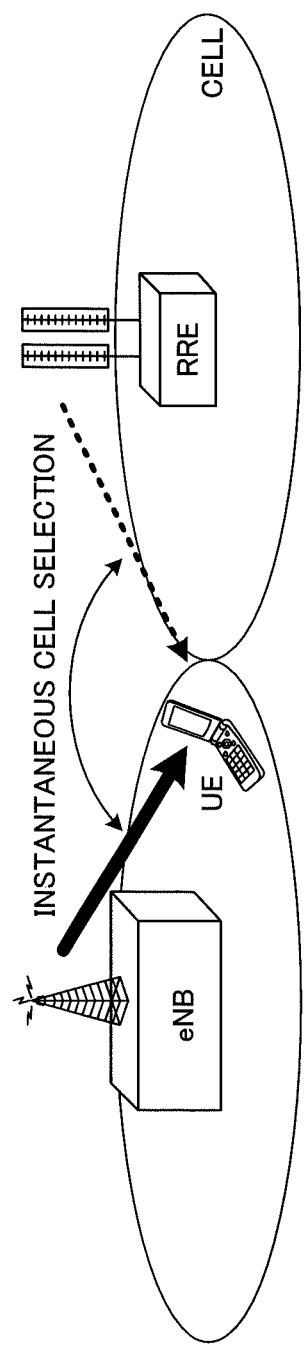
FIG. 1A
FIG. 1B

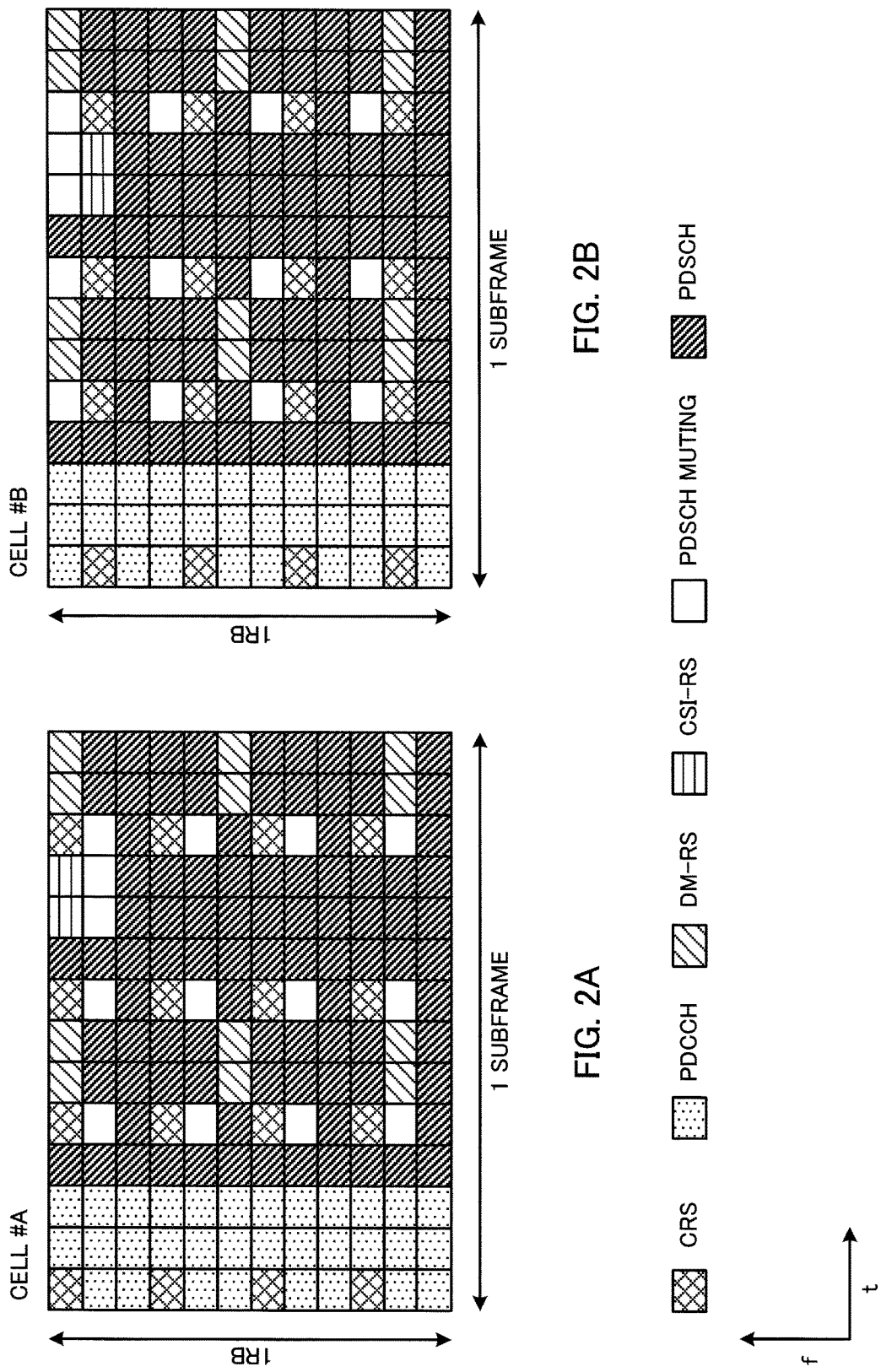

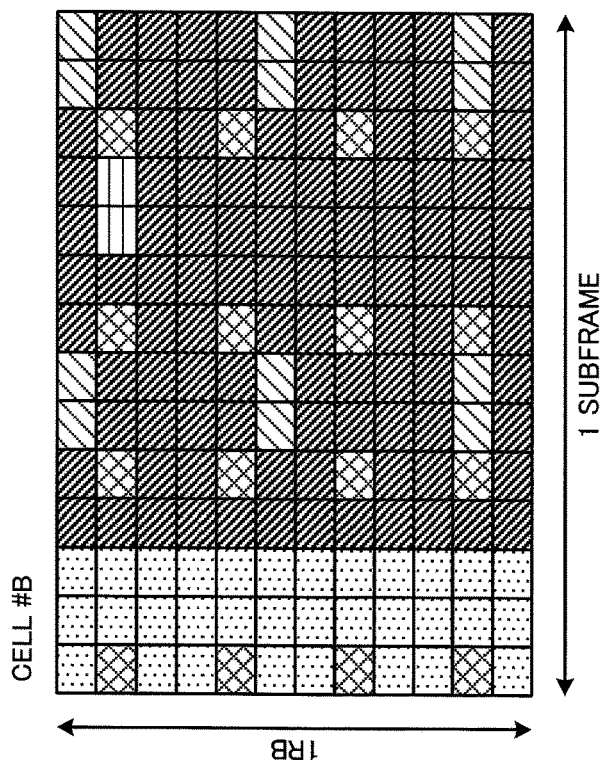
FIG. 3A
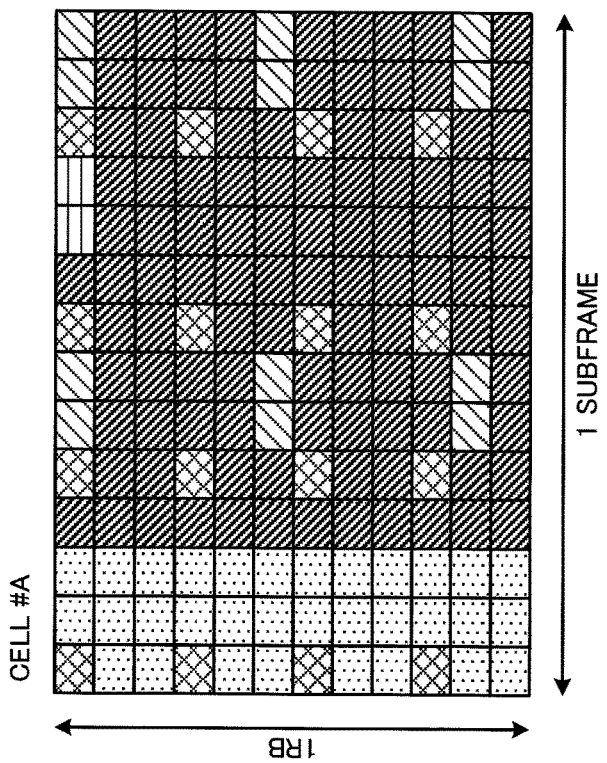
FIG. 3B
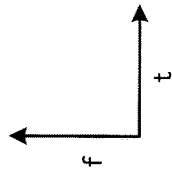

| BITMAP | PDSCH MUTING PATTERN |
|---|---|
| 00000 | NON-MUTING |
| 00001 | ONLY SHIFT OF THE SERVING CELL+1 |
| 00010 | ONLY SHIFT OF THE SERVING CELL+2 |
| 00100 | ONLY SHIFT OF THE SERVING CELL+3 |
| ⋮ | ⋮ |
| 11111 | SHIFT OF THE SERVING CELL+1/+2/+3/+4/+5 |

FIG. 4

| BITMAP | CRS MULTIPLEXING PATTERN EXCEPT THE SERVING CELL |
|---|---|
| 00000 | THE SAME AS THE SERVING CELL |
| 00001 | ONLY SHIFT OF THE SERVING CELL+1 |
| 00010 | ONLY SHIFT OF THE SERVING CELL+2 |
| 00100 | ONLY SHIFT OF THE SERVING CELL+3 |
| ⋮ | ⋮ |
| 11111 | SHIFT OF THE SERVING CELL+1/+2/+3/+4/+5 |

FIG. 6

| BIT | PDSCH MUTING PATTERN |
|---|---|
| 00 | NON-MUTING |
| 01 | ONLY SHIFT OF THE SERVING CELL+1 |
| 10 | ONLY SHIFT OF THE SERVING CELL+2 |
| 11 | SHIFT OF THE SERVING CELL+1/+2 |

| BIT | CRS MULTIPLEXING PATTERN EXCEPT THE SERVING CELL |
|---|---|
| 000 | THE SAME AS THE SERVING CELL |
| 001 | ONLY SHIFT OF THE SERVING CELL+1 |
| 010 | ONLY SHIFT OF THE SERVING CELL+2 |
| 011 | ONLY SHIFT OF THE SERVING CELL+3 |
| 100 | ONLY SHIFT OF THE SERVING CELL+4 |
| 101 | ONLY SHIFT OF THE SERVING CELL+5 |

| BIT | PDSCH MUTING PATTERN |
|---|---|
| 00 | NON-MUTING |
| 01 | ONLY SHIFT OF THE CoMP CELL #A |
| 10 | ONLY SHIFT OF THE CoMP CELL #B |
| 11 | SHIFTS OF THE CoMP CELLS #A AND #B |

FIG. 12

| BIT | CRS MULTIPLEXING PATTERN EXCEPT THE SERVING CELL |
|---|---|
| 00 | THE SAME AS THE SERVING CELL |
| 01 | ONLY SHIFT OF THE CoMP CELL #A |
| 10 | ONLY SHIFT OF THE CoMP CELL #B |
| 11 | SHIFTS OF THE CoMP CELLS #A AND #B |

FIG. 13

| BIT | PDSCH MULTIPLEXING STARTING POSITION |
|---|---|
| 00 | FIRST SYMBOL |
| 01 | SECOND SYMBOL |
| 10 | THIRD SYMBOL |
| 11 | FOURTH SYMBOL |

RADIO BASE STATION APPARATUS, MOBILE TERMINAL APPARATUS, RADIO COMMUNICATION METHOD AND RADIO COMMUNICATION SYSTEM

TECHNICAL FIELD

The present invention relates to a radio base station apparatus, mobile terminal apparatus, radio communication method and radio communication system, and more particularly, to a radio base station apparatus, mobile terminal apparatus, radio communication method and radio communication system for performing Coordinated Multi-Point (CoMP) transmission/reception.

BACKGROUND ART

In UMTS (Universal Mobile Telecommunications System) networks, for the purpose of improving spectral efficiency and further improving data rates, by adopting HSDPA (High Speed Downlink Packet Access) and HSUPA (High Speed Uplink Packet Access), it is performed exploiting maximum features of the system based on W-CDMA (Wideband Code Division Multiple Access). For the UMTS network, for the purpose of further increasing high-speed data rates, providing low delay and the like, Long Term Evolution (LTE) has been studied (Non-patent Document 1).

In the 3G system, a fixed band of 5 MHz is substantially used, and it is possible to achieve transmission rates of approximately maximum 2 Mbps in downlink. Meanwhile, in the LTE-scheme system, using variable bands ranging from 1.4 MHz to 20 MHz, it is possible to achieve transmission rates of maximum 300 Mbps in downlink and about 75 Mbps in uplink. Further, in the UMTS network, for the purpose of further increasing the wide-band and high speed, successor systems to LTE have been studied (for example, LTE Advanced (LTE-A)). For example, in LTE-A, it is scheduled to increase 20 MHz that is the maximum system band in LTE specifications to about 100 MHz.

As one of promising techniques to further improve system performance of Rel-8 LTE system, there is inter-cell orthogonalization. In LTE systems of Rel-10 or later (LTE-A system), intra-cell orthogonalization is achieved by orthogonal multiple access both in uplink and downlink. In other words, in downlink, mobile terminal apparatuses (User Equipments) are orthogonalized in the frequency domain. However, for inter-cell, interference randomizing by 1-cell frequency reuse is a base as in W-CDMA. The 3GPP (3rd Generation Partnership Project) has studied Coordinated Multi-Point transmission/reception (CoMP) as techniques for actualizing inter-cell orthogonalization. In CoMP transmission/reception, a plurality of cells coordinates to perform signal processing of transmission and reception on a single or a plurality of mobile terminal apparatuses (UEs). More specifically, in downlink, studied are Joint Transmission (JT), instantaneous cell selection (DCS) and the like (Joint Processing (JP)-CoMP).

CITATION LIST

Non-Patent Literature

Non-Patent Literature 1: 3GPP, TR25.912 (V7.1.0), "Feasibility study for Evolved UTRA and UTRAN", September 2006

SUMMARY OF THE INVENTION

Technical Problem

In the LTE system is defined a CRS (Cell-specific Reference Signal) used in channel estimation, symbol synchronization, CQI (Channel Quality Indicator) measurement, etc. To the multiplexing position of a CRS is applied a shift of subcarrier positions varying with cell IDs. In other words, the shift is automatically determined by the cell ID, and the multiplexing position is determined.

Further, in the LTE system is defined a PDCCH (Physical Downlink Control Channel) to notify of information (assignment information and the like) required for reception of a PDSCH (Physical Downlink Shared Channel) signal and transmission of a PUSCH (Physical Uplink Shared Channel) signal. To reduce a delay, the PDCCH signal is multiplexed into first 1 to 3 OFDM symbols of a subframe.

Thus, the CRS is multiplexed into different subcarrier positions for each cell. Further, the PDCCH is multiplexed into first 1 to 3 symbols of a subframe variably. Thus, since the CRS and PDCCH are sometimes multiplexed respectively into different positions for each cell, it is conceivable that a mobile terminal apparatus is not capable of correctly demodulating a data signal in applying JP-CoMP.

The present invention was made in view of such a respect, and it is an object of the invention to provide a radio base station apparatus, mobile terminal apparatus, radio communication method and radio communication system that enable the mobile terminal apparatus to correctly demodulate a data signal in the case of applying Coordinated Multi-Point transmission (CoMP), particularly, JP-CoMP.

Solution to Problem

A radio base station apparatus of the invention is characterized by comprising a generation section that generates information for demodulation of a data signal in a mobile terminal apparatus in applying Coordinated Multi-Point transmission, and a transmission section that transmits the information for demodulation to a mobile terminal apparatus that performs Coordinated Multi-Point reception.

A mobile terminal apparatus of the invention is characterized by comprising a reception section that receives information for demodulation of a data signal from a serving cell in applying Coordinated Multi-Point transmission, and a demodulation section that demodulates the data signal subjected to Coordinated Multi-Point reception using the information for demodulation.

A radio communication method of the invention is characterized by comprising the steps in a radio base station apparatus of generating information for demodulation of a data signal in a mobile terminal apparatus in applying Coordinated Multi-Point transmission, and transmitting the information for demodulation to a mobile terminal apparatus that performs Coordinated Multi-Point reception, and the steps in the mobile terminal apparatus of receiving the information for demodulation of a data signal, and demodulating the data signal subjected to Coordinated Multi-Point reception using the information for demodulation.

A radio communication system of the invention is characterized by comprising a radio base station apparatus having a generation section that generates information for demodulation of a data signal in a mobile terminal apparatus in applying Coordinated Multi-Point transmission, and a transmission section that transmits the information for demodulation to a mobile terminal apparatus that performs Coordinated Multi-Point reception, and a mobile terminal apparatus having a reception section that receives the information for demodulation of a data signal, and a demodulation section that demodulates the data signal subjected to Coordinated Multi-Point reception using the information for demodulation.

Technical Advantage of the Invention

In the invention, in applying Coordinated Multi-Point transmission, information for demodulation of a data signal in a mobile terminal apparatus is transmitted to the mobile terminal apparatus that performs Coordinated Multi-Point reception, the mobile terminal apparatus demodulates the data signal subjected to Coordinated Multi-Point reception using the information for demodulation, and therefore, in applying Coordinated Multi-Point transmission, particularly, JP-CoMP, it is possible to cause the mobile terminal apparatus to correctly demodulate the data signal.

BRIEF DESCRIPTION OF THE DRAWINGS

FIG. 1 is a diagram to explain JP-CoMP;
FIG. 2 contains diagrams to explain the effect of CRS in JT-CoMP;
FIG. 3 contains diagrams to explain the effect of CRS in DCS-CoMP;
FIG. 4 is a table to explain a first method-1 of a radio communication method according to the invention;
FIG. 6 is a table to explain a first method-2 of the radio communication method according to the invention;
FIG. 12 is a table to explain a third method-1 of the radio communication method according to the invention;
FIG. 13 is a table to explain a third method-2 of the radio communication method according to the invention.

DESCRIPTION OF EMBODIMENTS

Figure 5:
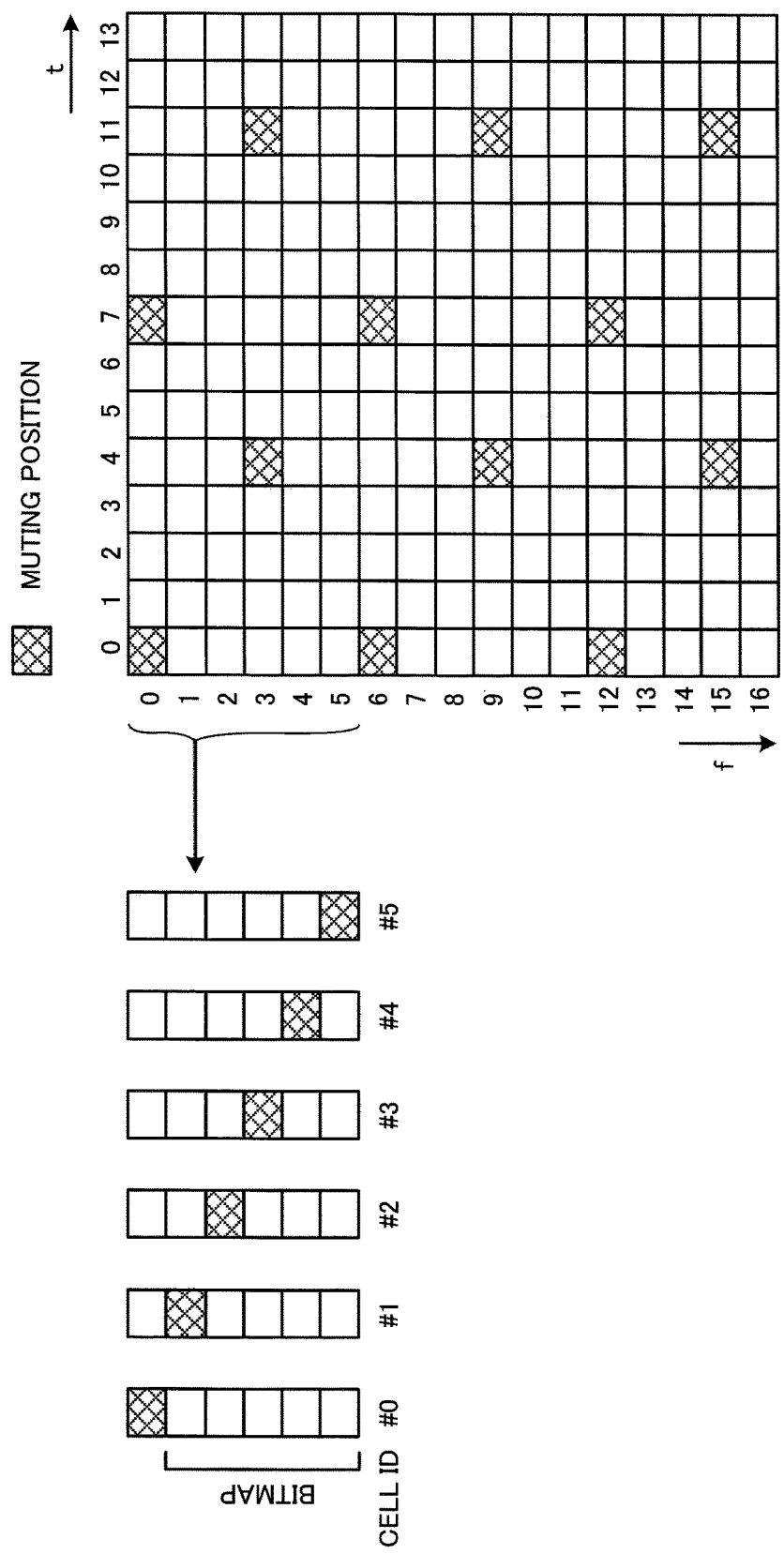
FIG. 5 is a diagram to explain the first method-1 of the radio communication method according to the invention.

Downlink CoMP transmission will be described first. As downlink CoMP transmission, there are Coordinated scheduling/Coordinated beamforming (CS/CB) and Joint processing. Coordinated scheduling/Coordinated beamforming is a method for transmitting to one UE from only one cell where radio resources in the frequency/spatial domain are allocated with consideration given to interference from another cell and interference to another cell. Meanwhile, Joint processing is simultaneous transmission of a plurality of cells applying precoding, and has Joint transmission in which a plurality of cells transmits to one UE as shown in FIG. 1A, and Dynamic Cell Selection in which a cell is instantaneously selected as shown in FIG. 1B.

As a configuration to actualize CoMP transmission, there is a configuration (centralized control based on a remote radio equipment configuration) including a radio base station apparatus eNB, and a plurality of remote radio equipments (RREs) connected to the radio base station apparatus eNB by an optical extension configuration (optical fibers). Further, there is another configuration (autonomous decentralized control based on an independent base station configuration) of a radio base station apparatus eNB. The present invention is applicable to both of the above-mentioned configurations.

In centralized control, the radio base station apparatus eNB intensively controls remote radio equipments. In the RRE configuration, the radio base station apparatus eNB (centralized base station) that performs baseband signal processing and control of a plurality of RREs and each cell i.e. RRE are connected with baseband signals using optical fibers, and the centralized base station is thereby capable of performing inter-cell radio resource control collectively. Meanwhile, in autonomous decentralized control, each of a plurality of radio base station apparatuses eNBs (or RREs) performs radio resource allocation control such as scheduling. In this case, by using an X2 interface among radio base station apparatuses, when necessary, a radio base station apparatus transmits timing information and radio resource allocation information such as scheduling to any one of the radio base station apparatuses to perform coordination between cells.

As described above, since the CRS and PDCCH are sometimes multiplexed into respective different positions for each cell, in applying JP-CoMP, it is conceivable that the mobile terminal apparatus is not capable of correctly demodulating a data signal.

For example, the CRS will be described with reference to FIG. 2. In the case of applying JT-CoMP, a plurality of cells e.g. a cell #A shown in FIG. 2A and a cell #B shown in FIG. 2B (herein, the cell #A is a serving cell, and the cell #B is a coordinated cell (adjacent cell)) transmits data to the same mobile terminal apparatus. In the case of applying such JT-CoMP, as shown in FIGS. 2A and 2B, when multiplexing positions of CRSs are different therebetween, there is a possibility that the CRS collides with a data signal, and that the mobile terminal apparatus is not capable of correctively receiving the CRS.

Therefore, in the case of applying JT-CoMP, in order for the CRS not to collide with a data signal in the mobile terminal apparatus, it is necessary to notify the mobile terminal apparatus of multiplexing positions of CRSs of a cell (adjacent cell (adjacent cell having a possibility of being a coordinated cell)) except the serving cell. Therefore, the radio base station apparatus of the serving cell notifies the mobile terminal apparatus of CRS multiplexing positions of the cell except the serving cell as information for demodulation.

In the case as shown in FIG. 2, the radio base station apparatus of the cell #A notifies the mobile terminal apparatus of the CRS multiplexing position information of the cell #B that is an adjacent cell. In the mobile terminal apparatus, the data signal is not multiplexed into the CRS multiplexing position of the cell #B so that the data signal of the cell #A does not collide. Therefore, the CRS multiplexing positions of the cell #B mean a muting pattern of the PDSCH of the cell #A. In addition, a shift amount is calculated from the cell ID, and it is possible to obtain the CRS multiplexing positions of the adjacent cell from the shift amount. In Aspect 1 in the invention, in order for the CRS not to collide with a data signal in the mobile terminal apparatus, the mobile terminal apparatus is notified of a muting pattern of the PDSCH of the serving cell. When the serving cell is the cell #A, the mobile terminal apparatus is notified of a pattern (CRS multiplexing positions of the cell #B) of PDSCH muting as shown in FIG. 2A, while when the serving cell is the cell #B, being notified of a pattern (CRS multiplexing positions of the cell #A) of PDSCH muting as shown in FIG. 2B.

Meanwhile, in the case of applying DCS-CoMP, data is transmitted to the same mobile terminal apparatus from any one of a plurality of cells, e.g. either the cell #A as shown in FIG. 3A or the cell #B as shown in FIG. 3B. Thus, in the case of applying DCS-CoMP, a single cell transmits the data. In this case, it is not necessary to perform muting (non-transmission) of PDSCHs unlike JT-CoMP (FIGS. 3A, 3B), and instead thereof, it is necessary to notify of CRS multiplexing positions of a CoMP cell (cell having a possibility of applying CoMP transmission). In other words, in the case of applying DCS-CoMP, it is necessary to notify the mobile terminal apparatus of CRS multiplexing positions (CRS multiplexing pattern) of a CoMP cell except the serving cell.

Among the notification methods of the pattern information (PDSCH muting pattern or CRS multiplexing pattern) are following four (first method to fourth method) methods.

(First Method-1)

This method is a method for notifying of a bitmap indicative of subcarrier positions as a muting pattern. In this method, the bitmap information is included in DCI (Downlink Control Information) and is dynamically notified. The mobile terminal apparatus has a table (table that associates the bitmap information included in the DCI with the muting pattern) as shown in FIG. 4, recognizes the muting pattern from the bitmap information notified by the DCI, and demodulates data signals using resources except the muting pattern.

The table as shown in FIG. 4 associates the bitmap information included in the DCI with the muting pattern, bitmap "00000" represents "non-muting", bitmap "00001" represents "only shift of the serving cell+1", bitmap "00010" represents "only shift of the serving cell+2", bitmap "00100" represents "only shift of the serving cell+3", and bitmap "11111" represents "shift of the serving cell+1/+2/+3/+4/+5". The bitmap indicates subcarrier positions as shown in FIG. 5. In FIG. 5, the serving cell represents a muting pattern of cell ID #0, "shift of the serving cell+1" represents a muting pattern of cell ID #1, "shift of the serving cell+2" represents a muting pattern of cell ID #2, and "shift of the serving cell+3" represents a muting pattern of cell ID #3.

In addition, the table as shown in FIG. 4 is one example, and the invention is not limited thereto. Further, although FIGS. 4 and 5 show the case of one antenna, this method is applicable to the case of two or more antennas.

(First Method-2)

This method is a method for notifying of a bitmap indicative of subcarrier positions as a CRS multiplexing pattern. In this method, the bitmap information is included in DCI (Downlink Control Information) and is dynamically notified. The mobile terminal apparatus has a table (table that associates the bitmap information included in the DCI with the CRS multiplexing pattern) as shown in FIG. 6, recognizes the CRS multiplexing pattern from the bitmap information notified by the DCI, and demodulates data signals using resources except the CRS multiplexing positions.

Figure 7:
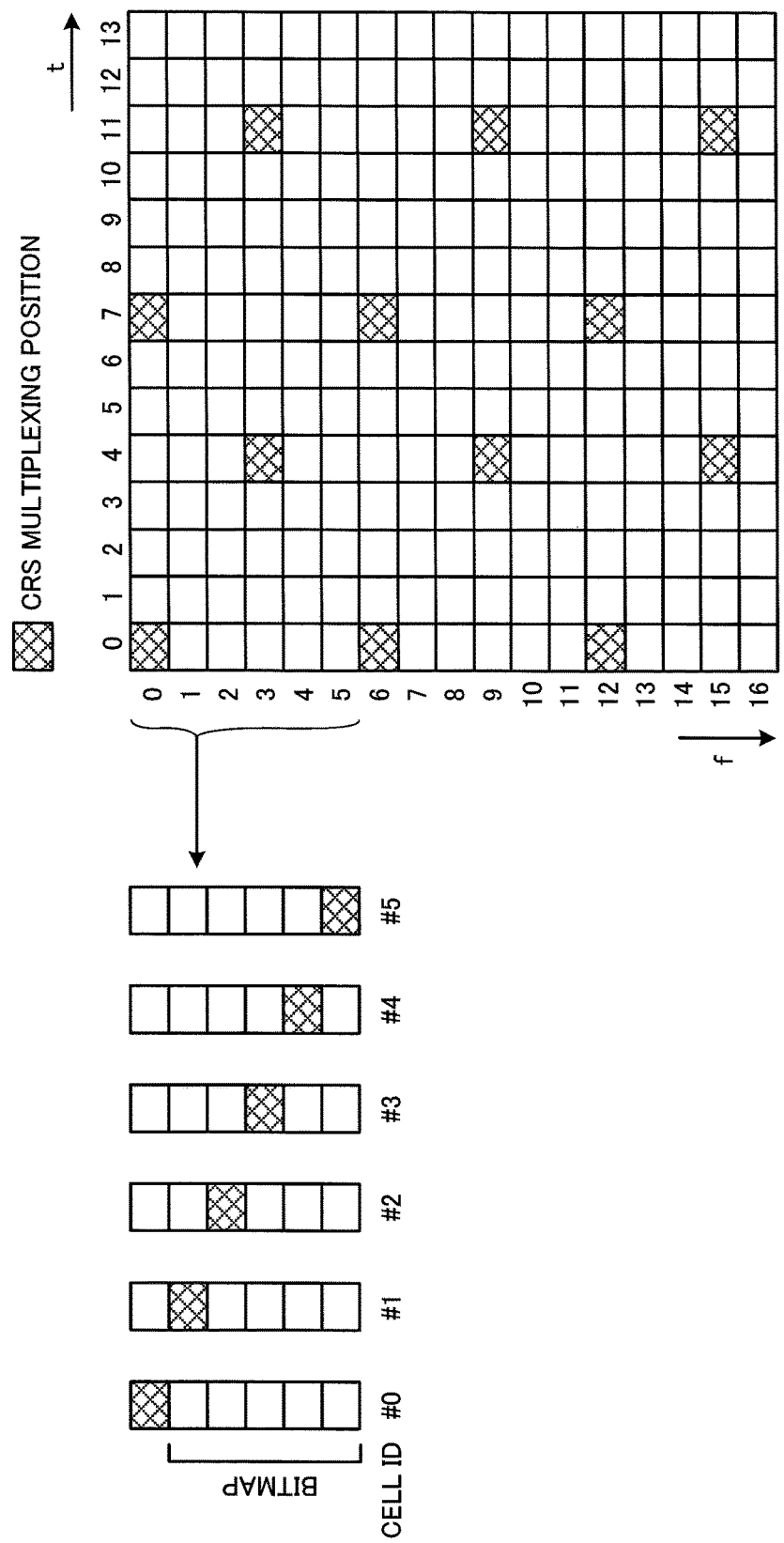
FIG. 7 is a diagram to explain the first method-2 of the radio communication method according to the invention.

The table as shown in FIG. 6 associates the bitmap information included in the DCI with the CRS multiplexing pattern, bitmap "00000" represents "the same as the serving cell", bitmap "00001" represents "only shift of the serving cell+1", bitmap "00010" represents "only shift of the serving cell+2", bitmap "00100" represents "only shift of the serving cell+3", and bitmap "11111" represents "shift of the serving cell+1/+2/+3/+4/+5". The bitmap indicates subcarrier positions as shown in FIG. 7. In FIG. 7, the serving cell represents a CRS multiplexing pattern of cell ID #0, "shift of the serving cell+1" represents a CRS multiplexing pattern of cell ID#1, "shift of the serving cell+2" represents a CRS multiplexing pattern of cell ID #2, and "shift of the serving cell+3" represents a CRS multiplexing pattern of cell ID#3.

In addition, the table as shown in FIG. 6 is one example, and the invention is not limited thereto. Further, although FIGS. 6 and 7 show the case of one antenna, this method is applicable to the case of two or more antennas.

(Second Method-1)

This method is a method for notifying of downlink control information indicative of a muting pattern as a muting pattern. In this method, bits representing a muting pattern are included in the DCI and are dynamically notified. In this case, the downlink control information is associated with the muting pattern. The mobile terminal apparatus has a table (table that associates the bits included in the DCI with the muting pattern) as shown in FIG. 8, recognizes the muting pattern from the bits notified by the DCI, and demodulates data signals using resources except the muting pattern.

Figures 8, 9:
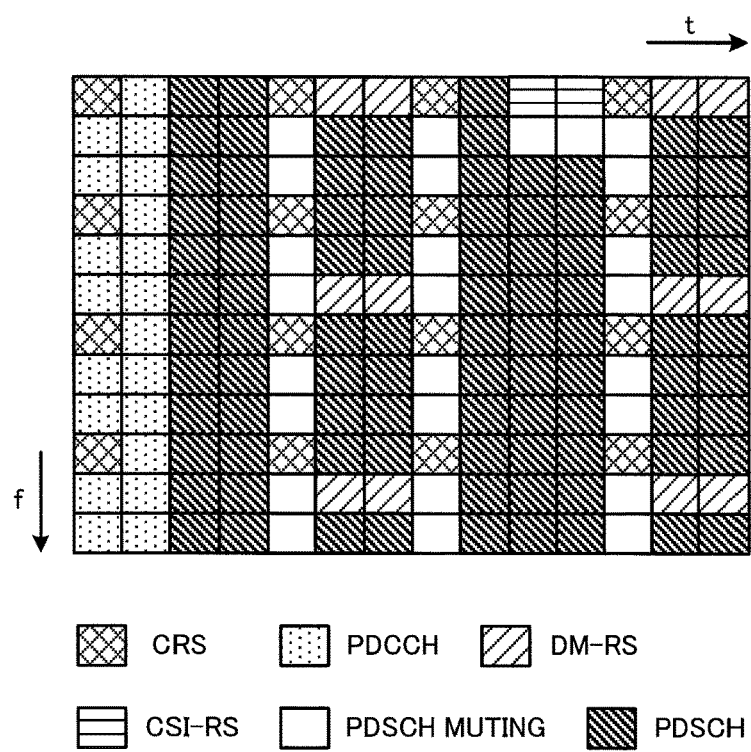
FIG. 8 is a table to explain a second method-1 of the radio communication method according to the invention.
FIG. 9 is a diagram to explain the second method-1 of the radio communication method according to the invention.

The table as shown in FIG. 8 associates the bits included in the DCI with the muting pattern, bits "00" represent "non-muting", bits "01" represent "only shift of the serving cell+1", bits "10" represent "only shift of the serving cell+2", and bits "11" represent "shift of the serving cell+1/+2". For example, bits "01" represent the muting pattern as shown in FIG. 2A, and bits "11" represent the muting pattern as shown in FIG. 9. In addition, the table as shown in FIG. 8 is one example, and the invention is not limited thereto.

(Second Method-2)

This method is a method for notifying of downlink control information indicative of a CRS multiplexing pattern as a CRS multiplexing pattern. In this method, bits representing a CRS multiplexing pattern are included in the DCI and are dynamically notified. In this case, the downlink control information is associated with the CRS multiplexing pattern. The mobile terminal apparatus has a table (table that associates the bits included in the DCI with the CRS multiplexing pattern) as shown in FIG. 10, recognizes the CRS multiplexing pattern from the bits notified by the DCI, and demodulates data signals using resources except the CRS multiplexing positions.

Figures 10, 11:
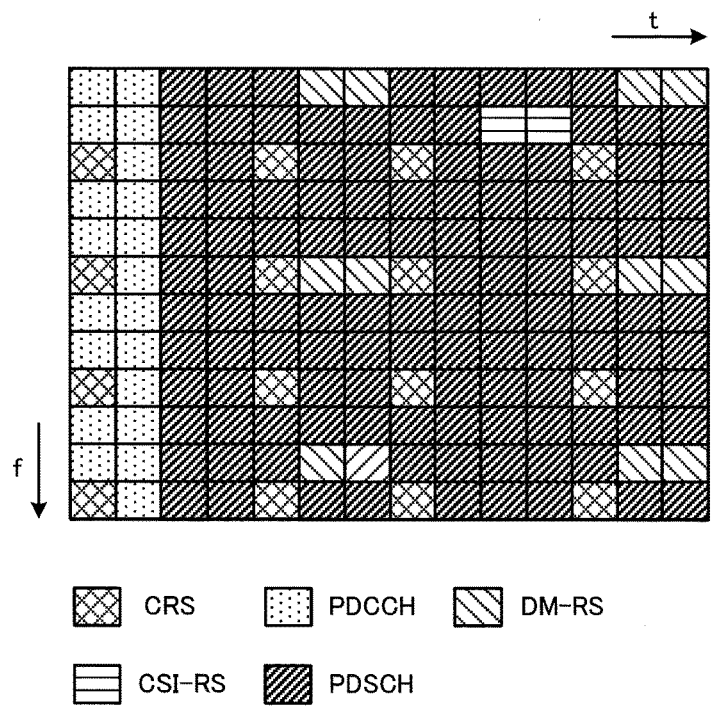
FIG. 10 is a table to explain a second method-2 of the radio communication method according to the invention.
FIG. 11 is a diagram to explain the second method-2 of the radio communication method according to the invention.

The table as shown in FIG. 10 associates the bits included in the DCI with the CRS multiplexing pattern, bits "000" represent "the same as the serving cell", bits "001" represent "only shift of the serving cell+1", bits "010" represent "only shift of the serving cell+2", bits "011" represent "only shift of the serving cell+3", bits "100" represent "only shift of the serving cell+4", and bits "101" represent "only shift of the serving cell+5". For example, bits "001" represent the CRS multiplexing pattern as shown in FIG. 3B, and bits "010" represent the CRS multiplexing pattern as shown in FIG. 11. In addition, the table as shown in FIG. 10 is one example, and the invention is not limited thereto.

(Third Method-1)

This method is a method for notifying of a muting pattern with cell identification information of a CoMP cell transmitted by higher-layer signaling and downlink control information corresponding to information (information on a cell for muting) of the CoMP cell. In this case, the downlink control information is associated with the information of the CoMP cell. The mobile terminal apparatus has a table (table that associates bits included in the DCI with the information of the CoMP cell) as shown in FIG. 12, obtains the muting pattern from the information of the CoMP cell from the bits notified by the DCI, and the cell identification information (cell ID) of the CoMP cell notified by higher-layer signaling, and demodulates data signals using resources except the muting pattern.

In this method, the radio base station apparatus notifies the mobile terminal apparatus of the cell ID of the CoMP cell (cell having a possibility of applying CoMP transmission) by higher-layer signaling. For example, when CoMP cells are the cell #A and cell #B, the radio base station apparatus notifies the mobile terminal apparatus of cell ID No. 7 of the cell #A, and cell ID No. 8 of the cell #B. Meanwhile, the radio base station apparatus notifies the mobile terminal apparatus of the information of the CoMP cell with the DCI. For example, as the information of the CoMP cell, the radio base station apparatus notifies the mobile terminal apparatus of bits "10" of the DCI indicative of "only shift of the CoMP cell #B". The mobile terminal apparatus obtains the muting pattern from the cell ID number and the information of the CoMP cell. In other words, the mobile terminal apparatus calculates Mod 6 of the cell ID number of the cell #B to calculate a shift amount 2 (remainder operation), and from the amount, obtains the muting pattern (shift of the serving cell+2). In addition, the table as shown in FIG. 12 and cell ID numbers are shown by way of example, and the invention is not limited thereto.

(Third Method-2)

This method is a method for notifying of a CRS multiplexing pattern with cell identification information of a CoMP cell transmitted by higher-layer signaling and downlink control information corresponding to information (information on a cell of the CRS multiplexing pattern) of the CoMP cell. In this case, the downlink control information is associated with the information of the CoMP cell. The mobile terminal apparatus has a table (table that associates bits included in the DCI with the information of the CoMP cell) as shown in FIG. 13, obtains the CRS multiplexing pattern from the information of the CoMP cell from the bits notified by the DCI, and the cell identification information (cell ID) of the CoMP cell notified by higher-layer signaling, and demodulates data signals using resources except the CRS multiplexing positions.

In this method, the radio base station apparatus notifies the mobile terminal apparatus of the cell ID of the CoMP cell (cell having a possibility of applying CoMP transmission) by higher-layer signaling. For example, when CoMP cells are the cell #A and cell #B, the radio base station apparatus notifies the mobile terminal apparatus of cell ID No. 7 of the cell #A, and cell ID No. 8 of the cell #B. Meanwhile, the radio base station apparatus notifies the mobile terminal apparatus of the information of the CoMP cell with the DCI. For example, as the information of the CoMP cell, the radio base station apparatus notifies the mobile terminal apparatus of bits "10" of the DCI indicative of "only shift of the CoMP cell #B". The mobile terminal apparatus obtains the CRS multiplexing pattern from the cell ID number and the information of the CoMP cell. In other words, the mobile terminal apparatus calculates Mod 6 of the cell ID number of the cell #B to calculate a shift amount 2 (remainder operation), and from the amount, obtains the CRS multiplexing pattern (shift of the serving cell+2). In addition, the table as shown in FIG. 13 and cell ID numbers are shown by way of example, and the invention is not limited thereto.

(Fourth Method-1)

This method is a method for notifying of a muting pattern by higher-layer signaling (for example, RRC signaling). In this method, the muting pattern is notified semi-statically. The muting pattern notified by higher-layer signaling may be the bitmap information used in the above-mentioned first method, or may be the bit information used in the above-mentioned second method.

In this method, the muting pattern may be static. When the muting pattern is static, as shown in FIG. 15, for symbols (X) into which the CRS is multiplexed in the PDSCH region, data signals are not assigned to the mobile terminal apparatus that performs CoMP reception. In other words, for the mobile terminal apparatus that performs CoMP reception, the muting pattern is a pattern of all symbols (X) into which the CRS is multiplexed in the CoMP cell.

(Fourth Method-2)

This method is a method for notifying of a CRS multiplexing pattern by higher-layer signaling (for example, RRC signaling). In this method, the CRS multiplexing pattern is notified semi-statically. The CRS multiplexing pattern notified by higher-layer signaling may be the bitmap information used in the above-mentioned first method-2, or may be the bit information used in the above-mentioned second method-2.

Figure 14:
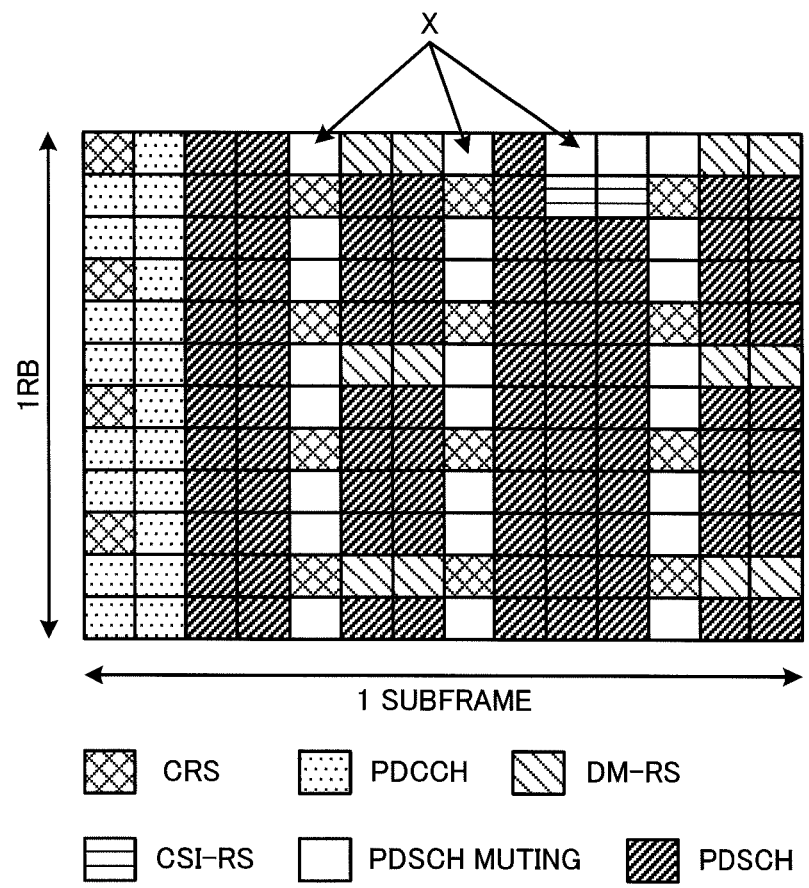
FIG. 14 is a diagram to explain a fourth method-1 and fourth method-2 of the radio communication method according to the invention.

In this method, the CRS multiplexing pattern may be static. When the CRS multiplexing pattern is static, as shown in FIG. 14, for symbols (X) into which the CRS is multiplexed in the PDSCH region, data signals are not assigned to the mobile terminal apparatus that performs CoMP reception. In other words, for the mobile terminal apparatus that performs CoMP reception, the CRS multiplexing pattern is a pattern of all symbols (X) into which the CRS is multiplexed in the CoMP cell.

As in the CRS, the PDCCHs are sometimes multiplexed into different positions for each cell, and in applying JP-CoMP, it is conceivable that the mobile terminal apparatus is not capable of correctly demodulating a data signal.

Figure 15B:
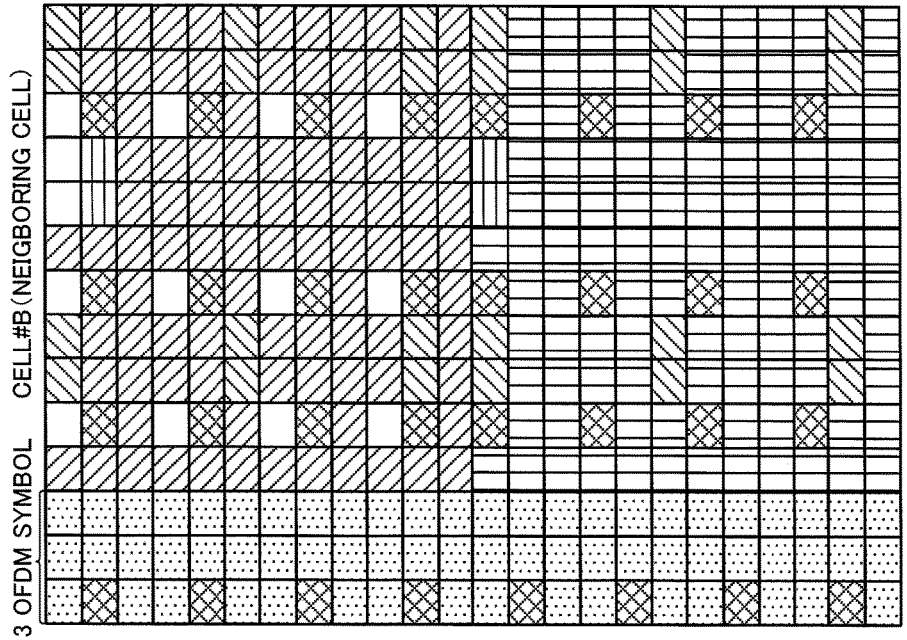
FIG. 15 contains diagrams to explain the effect of PDCCH length in JP-CoMP.
Figure 15A:
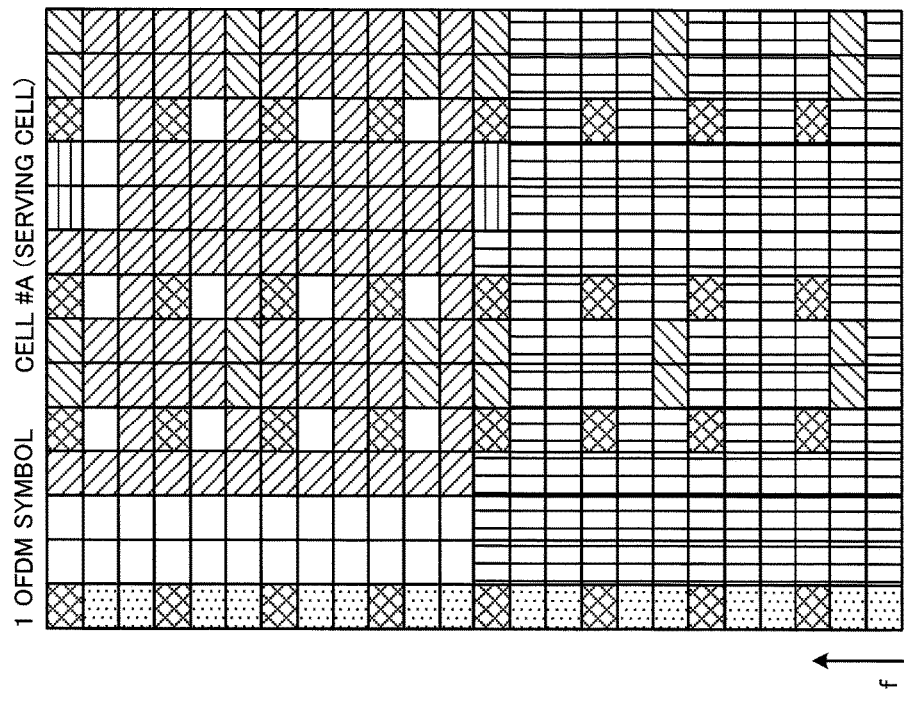

Since the PDCCH signal is multiplexed into first 1 OFDM symbol to 3 OFDM symbols of a subframe, it is conceivable that a PDCCH symbol length of the serving cell (cell #A, FIG. 15A) is different from a PDCCH symbol length of the adjacent cell (cell #B, FIG. 15B). In this case, when JP-CoMP is applied, it is necessary to transmit data to the mobile terminal apparatus that performs CoMP reception, in accordance with a cell with a long PDCCH symbol length. For example, in the case of applying JP-CoMP, as shown in FIG. 15, when the PDCCH length of the serving cell is shorter than the PDCCH length of the adjacent cell, it is necessary to notify the mobile terminal apparatus that performs CoMP reception of the PDCCH length of the cell except the serving cell. Therefore, the radio base station apparatus of the serving cell notifies the mobile terminal apparatus of the PDCCH length of the cell except the serving cell as information for demodulation. In addition, in the mobile terminal apparatus, when the information of the PDDCH length is received, since the PDSCH is multiplexed from the PDCCH length+1 OFDM symbol, a multiplexing starting position of the PDSCH may be used as the information for demodulation, instead of the PDCCH length.

As the method for notifying of the information of the PDSCH multiplexing starting position, there are following two methods (fifth method, sixth method).

(Fifth Method)

This method is a method for notifying of downlink control information indicative of a PDSCH multiplexing starting position. In this method, bits representing a PDSCH multiplexing starting position are included in the DCI and are dynamically notified. In this case, the downlink control information is associated with the PDSCH multiplexing starting position. The mobile terminal apparatus has a table (table that associates the bits included in the DCI with the PDSCH multiplexing starting position) as shown in FIG. 16, recognizes the PDSCH multiplexing starting position from the bits notified by the DCI, and demodulates data signals from the multiplexing starting position.

Figures 16, 17:
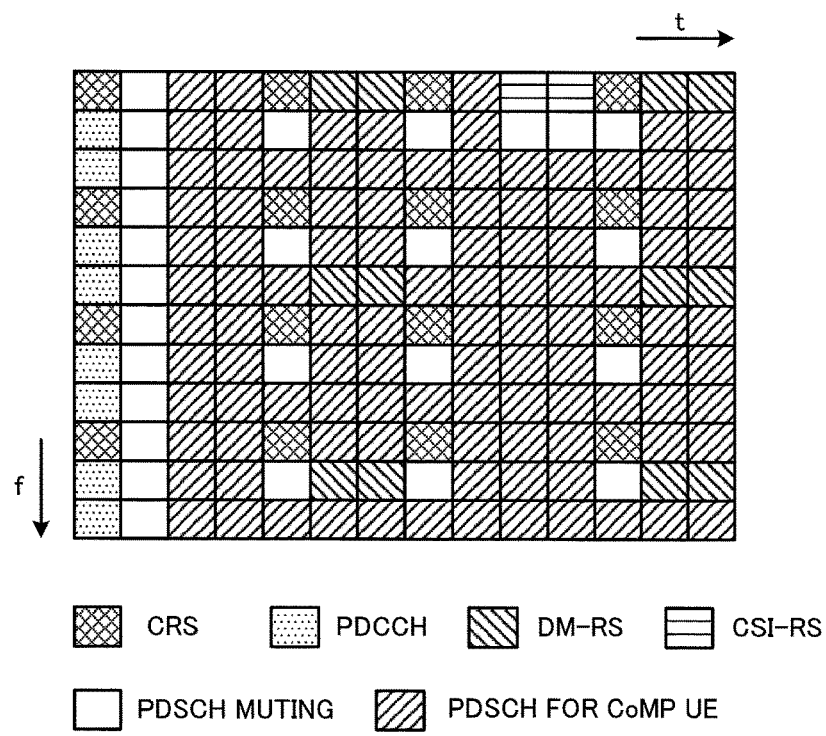
FIG. 16 is a table to explain a fifth method of the radio communication method according to the invention.
FIG. 17 is a diagram to explain the fifth method of the radio communication method according to the invention.

The table as shown in FIG. 16 associates the bits included in the DCI with the PDSCH multiplexing starting position, bits "00" represent "the first symbol", bits "01" represent "the second symbol", bits "10" represent "the third symbol", and bits "11" represent "the fourth symbol". For example, bits "01" represent the PDSCH multiplexing starting position (the third symbol) of FIG. 17. In addition, the table as shown in FIG. 16 is one example, and the invention is not limited thereto.

(Sixth Method)

This method is a method for notifying of a PDSCH multiplexing starting position by higher-layer signaling (for example, RRC signaling). In this method, the PDSCH multiplexing starting position is notified semi-statically. The PDSCH multiplexing starting position notified by higher-layer signaling may be the bit information used in the above-mentioned fifth method.

In this method, the PDSCH multiplexing starting position may be static. When the PDSCH multiplexing starting position is made static, the multiplexing starting position is always fixed (for example, the fourth symbol).

In addition, in the case of notifying of the PDSCH multiplexing starting position, the radio base station apparatus determines whether the PDCCH length of the serving cell is shorter than the PDCCH length of the adjacent cell. When the PDCCH length of the serving cell is shorter than the PDCCH length of the adjacent cell, the radio base station apparatus determines a PDSCH multiplexing starting position in consideration of the PDCCH length of the adjacent cell, and notifies the mobile terminal apparatus of the multiplexing starting position. For example, when the PDCCH length of the serving cell is shorter than the PDCCH length of the adjacent cell, the radio base station apparatus sets the longest PDCCH length among PDCCH lengths of adjacent cells+1 symbol as a PDSCH multiplexing starting position. Accordingly, when the PDCCH length is maximum three symbols, the PDSCH multiplexing starting position is the fourth symbol at the maximum.

As described above, the information for demodulation is information to support demodulation of data signals in the mobile terminal apparatus, and in the case where the purpose is avoiding a collision between the CRS and data signal, is information on multiplexing positions of CRSs of cells except the serving cell. Further, in the case where the purpose is allowing a difference between PDCCH symbol lengths, the information for demodulation is information on the PDCCH symbol length or PDSCH multiplexing starting position. In addition, in the case where the purpose is both, the information for demodulation is naturally the information on multiplexing positions of CRSs of cells except the serving cell, and the information on the PDCCH symbol length or PDSCH multiplexing starting position.

Thus, in the present invention, in applying Coordinated Multi-Point transmission, the information for demodulation of a data signal in a mobile terminal apparatus is transmitted to the mobile terminal apparatus that performs Coordinated Multi-Point reception, the mobile terminal apparatus demodulates the data signal subjected to Coordinated Multi-Point reception using the information for demodulation, and therefore, in applying Coordinated Multi-Point transmission, particularly, JP-CoMP, it is possible to cause the mobile terminal apparatus to correctly demodulate the data signal.

An Embodiment of the invention will specifically be described below with reference to accompanying drawings. Described herein is the case of using radio base station apparatuses and mobile terminal apparatuses that support LTE-A systems.

Figure 18:
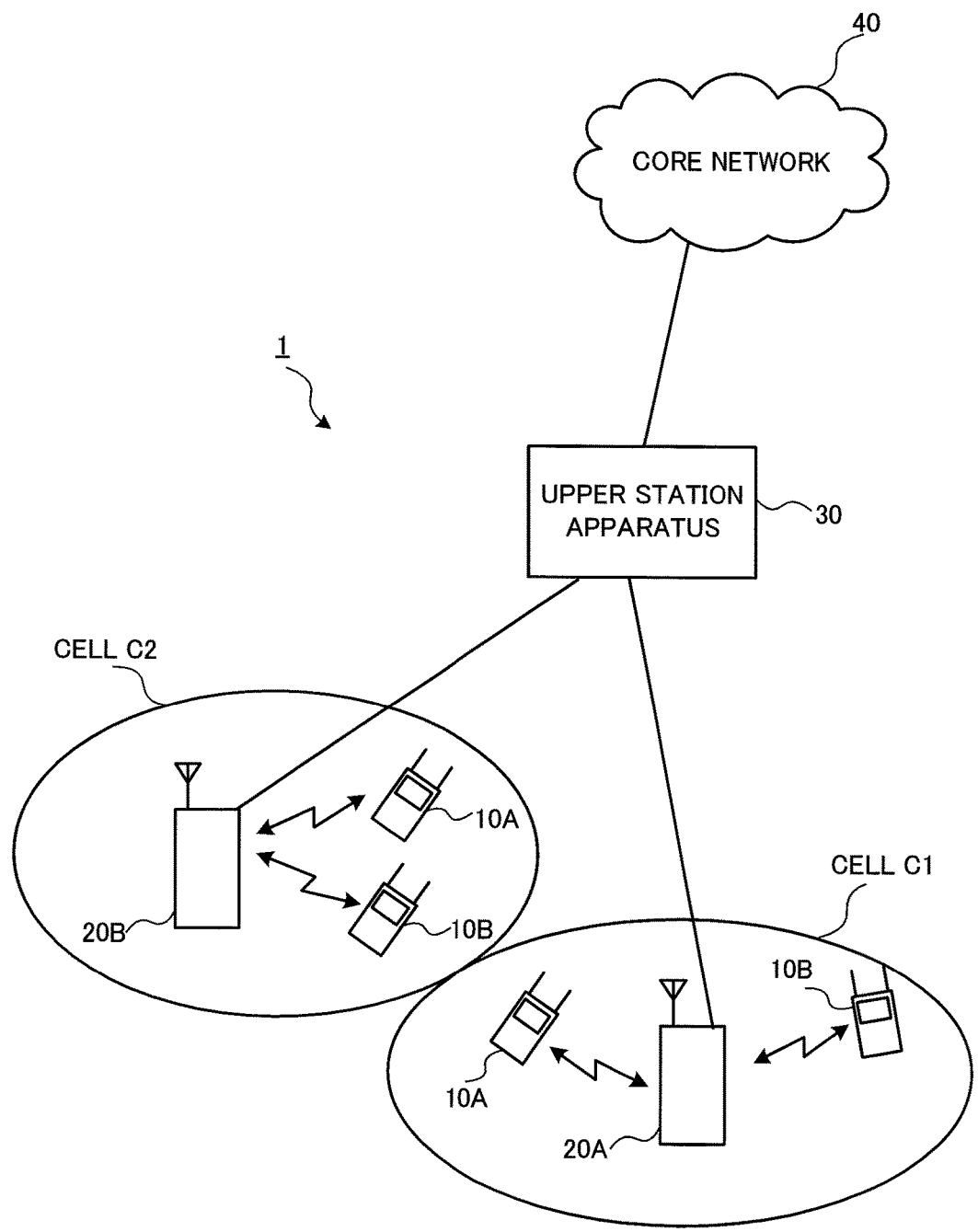
FIG. 18 is a diagram to explain a configuration of a radio communication system.

Referring to FIG. 18, described is a radio communication system having mobile terminal apparatuses (UEs: User Equipments) 10 and radio base station apparatuses (eNode B) 20 according to one Embodiment of the invention. FIG. 18 is a diagram to explain a configuration of a radio communication system 1 having the mobile terminal apparatuses 10 and radio base station apparatuses 20 according to the invention. In addition, the radio communication system 1 as shown in FIG. 18 is a system including the LTE system or SUPER 3G, for example. Further, the mobile communication system 1 may be called IMT-Advanced or may be called 4G.

As shown in FIG. 18, the radio communication system 1 includes the radio base station apparatuses 20A and 20B, and a plurality of mobile terminal apparatuses 10A and 10B that communicate with the radio base station apparatuses 20A and 20B, and is comprised thereof. The radio base station apparatuses 20A and 20B are connected to an upper station apparatus 30, and the upper station apparatus 30 is connected to a core network 40. The mobile terminal apparatuses 10A and 10B communicate with the radio base station apparatus 20A in a cell C1, and communicate with the radio base station apparatus 20B in a cell C2. In addition, for example, the upper station apparatus 30 includes an access gateway apparatus, radio network controller (RNC), mobility management entity (MME), etc., but is not limited thereto.

Each of the mobile terminal apparatuses (10A, 10B) has the same configuration, functions and state, and is described as a mobile terminal apparatus 10 to proceed with the description unless convenience in description, the description is given while assuming that equipment that performs radio communications with the radio base station apparatuses 20A and 20B is the mobile terminal apparatus 10, and more generally, the equipment may be user equipments (UEs) including mobile terminal apparatuses and fixed terminal apparatuses.

In the radio communication system 1, as a radio access scheme, OFDMA (Orthogonal Frequency Division Multiple Access) is applied in downlink, while SC-FDMA (Single-Carrier Frequency Division Multiple Access) is applied in uplink. OFDMA is a multicarrier transmission scheme for dividing a frequency band into a plurality of narrow frequency bands (subcarriers), and mapping data to each subcarrier to perform communications. SC-FDMA is a single-carrier transmission scheme for dividing the system band into bands comprised of a single or consecutive resource blocks for each terminal so that a plurality of terminals uses mutually different bands, and thereby reducing interference among the terminals.

Described herein are communication channels in the LTE system. The downlink communication channels have the PDSCH as a downlink data channel shared among the mobile terminal apparatuses 10A and 10B, and downlink L1/L2 control channels (PDCCH, PCFICH, PHICH). Transmission data and higher control information is transmitted on the PDSCH. Scheduling information of the PDSCH and PUSCH and the like is transmitted on the PDCCH. The number of OFDM symbols used in the PDCCH is transmitted on the PCFICH (Physical Control Format Indicator Channel). ACK/NACK of HARQ to the PUSCH is transmitted on the PHICH (Physical Hybrid-ARQ Indicator Channel).

The uplink control channels have the PUSCH (Physical Uplink Shared Channel) as an uplink data channel shared among the mobile terminal apparatuses, and the PUCCH (Physical Uplink Control Channel) that is a control channel in uplink. Transmission data and higher control information is transmitted on the PUSCH. Further, on the PUCCH is transmitted downlink radio quality information (CQI: Channel Quality Indicator), ACK/NACK and the like.

Figure 19:
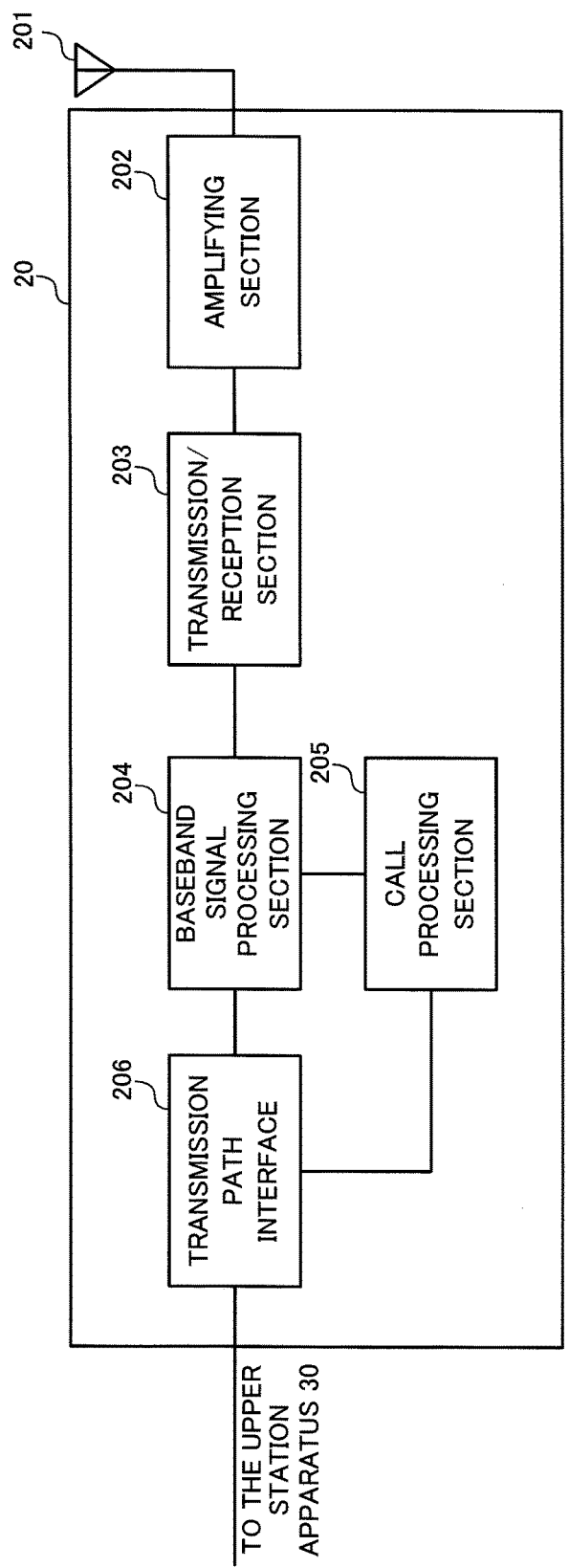
FIG. 19 is an explanatory view of an entire configuration of a radio base station apparatus.

Referring to FIG. 19, described is the entire configuration of the radio base station apparatus according to this Embodiment. In addition, the radio base station apparatuses 20A and 20B have the same configuration, and therefore, are described as the radio base station apparatus 20. Further, the mobile terminal apparatuses 10A, 10B have the same configuration, and therefore, are described as the mobile terminal apparatus 10. The radio base station apparatus 20 is provided with a transmission/reception antenna 201, amplifying section 202, transmission/reception section (notification section) 203, baseband signal processing section 204, call processing section 205 and transmission path interface 206. The transmission data to transmit from the radio base station apparatus 20 to the mobile terminal apparatus 10 in downlink is input to the baseband signal processing section 204 via the transmission path interface 206 from the upper station apparatus 30.

The baseband signal processing section 204 performs, on the downlink data channel signal, PDCP layer processing, segmentation and concatenation of the transmission data, RLC (Radio Link Control) layer transmission processing such as transmission processing of RLC retransmission control, MAC (Medium Access Control) retransmission control e.g. HARQ transmission processing, scheduling, transmission format selection, channel coding, Inverse Fast Fourier Transform (IFFT) processing and precoding processing. Further, on a signal of the Physical Downlink Control Channel that is a downlink control channel, the section 204 also performs transmission processing of channel coding, Inverse Fast Fourier Transform and the like.

Further, the baseband signal processing section 204 notifies mobile terminal apparatuses 10 connected to the same cell of control information for each mobile terminal apparatus 10 to perform radio communications with the radio base station apparatus 20 on the broadcast channel. For example, the information for communications in the cell includes the system bandwidth in uplink or downlink, identification information (Root Sequence Index) of a root sequence to generate a signal of a random access preamble on the PRACH (Physical Random Access Channel), etc.

The transmission/reception section 203 converts the frequency of the baseband signal output from the baseband signal processing section 204 into a radio frequency band. The amplifying section 202 amplifies a radio frequency signal subjected to frequency conversion to output to the transmission/reception antenna 201. In addition, the transmission/reception section 203 constitutes the reception section that receives an uplink signal including information of a phase difference among a plurality of cells and PMI, and a transmission section that performs Coordinated Multi-Point transmission on a transmission signal.

Meanwhile, with respect to signals transmitted from the mobile terminal apparatus 10 to the radio base station apparatus 20 in uplink, a radio frequency signal received in the transmission/reception antenna 201 is amplified in the amplifying section 202, subjected to frequency conversion in the transmission/reception section 203, thereby converted into a baseband signal, and is input to the baseband signal processing section 204.

The baseband signal processing section 204 performs FFT processing, IDFT processing, error correcting decoding, reception processing of MAC retransmission control, and reception processing of RLC layer and PDCP layer on the transmission data included in the baseband signal received in uplink. The decoded signal is transferred to the upper station apparatus 30 via the transmission path interface 206.

The call processing section 205 performs call processing such as setting and release of the communication channel, status management of the radio base station apparatus 20, and management of radio resources.

Functional blocks of the radio base station apparatus 20 will be described with reference to FIG. 20. Each functional block of FIG. 20 mainly shows the processing content of the baseband processing section. Further, the functional blocks as shown in FIG. 20 are simplified to explain the present invention, and are assumed to have the configuration that is usually provided in the baseband processing section.

Figure 20:
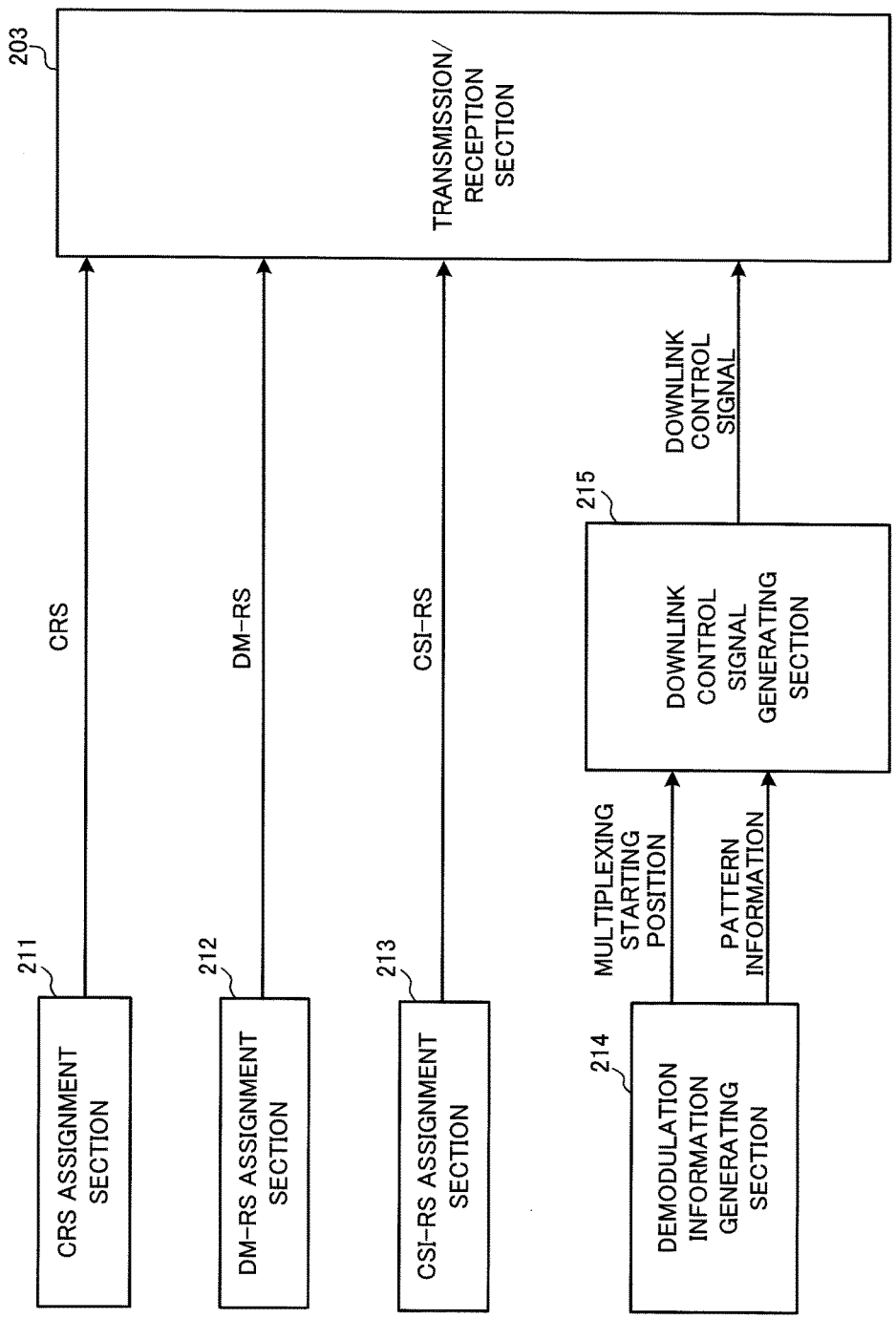
FIG. 20 is a functional block diagram corresponding to the radio communication method of the invention by the radio base station apparatus.

As shown in FIG. 20, the radio base station apparatus 20 has a CRS assignment section 211, DM-RS assignment section 212, CSI-RS assignment section 213, demodulation information generating section 214, downlink control signal generating section 215, and transmission/reception section 203. In applying CoMP transmission, the radio base station apparatus 20 generates information for demodulation of data signals in the mobile terminal apparatus, and transmits the information for demodulation to the mobile terminal apparatus that performs CoMP reception.

The CSI assignment section 211 allocates CRSs to resources for CRS transmission in a resource block of each subframe. According to a CRS allocation pattern that defines CRS allocation positions in order for CRSs not to overlap other control signals, CRSs are allocated to corresponding resource elements on the resource block.

The DM-RS (Demodulation-Reference Signal) assignment section 212 allocates DM-RSs to resources for DM-RS transmission in a resource block of each subframe. The CSI-RS (Channel State Information-Reference Signal) Demodulation-Reference Signal) assignment section 213 allocates CSI-RSs to a corresponding subframe in a radio frame at CSI-RS transmission intervals (for example, 10 ms or 8 ms).

The demodulation information generating section 214 generates the information for demodulation of data signals in the mobile terminal apparatus, and outputs the information for demodulation to the downlink control signal generating section 215. As described above, the information for demodulation means the information of the PDSCH muting pattern, CRS multiplexing pattern, and PDSCH starting position. As the information for demodulation, the demodulation information generating section 214 may generate the PDSCH muting pattern or CRS multiplexing pattern (pattern information), may generate the bitmap information indicative of subcarrier positions on the PDSCH muting pattern or CRS multiplexing pattern (pattern information), or may generate the information (information on a cell for muting or cell of the CRS multiplexing pattern) of the CoMP cell on the PDSCH muting pattern or CRS multiplexing pattern (pattern information). Accordingly, the demodulation information generating section 214 generates the bitmap information indicative of subcarrier positions on the PDSCH muting pattern as the information for demodulation in the first method-1, generates the PDSCH muting pattern as the information for demodulation in the second-method 1, and generates the information of the CoMP cell on the PDSCH muting pattern in the third method-1. Further, the demodulation information generating section 214 generates the bitmap information indicative of subcarrier positions on the CRS multiplexing pattern as the information for demodulation in the first method-2, generates the CRS multiplexing pattern as the information for demodulation in the second-method 2, and generates the information of the CoMP cell on the CRS multiplexing pattern in the third method-2. Furthermore, the demodulation information generating section 214 generates the PDSCH multiplexing starting position information as the information for demodulation in the fifth method.

The downlink control signal generating section 215 includes the information of the PDSCH muting pattern, CRS multiplexing pattern or the PDSCH starting position in the DCI to generate a downlink control signal. The downlink control signal generating section 215 includes the bitmap indicative of subcarrier positions on the PDSCH muting pattern in the DCI to generate a downlink control signal in the first method-1, includes bits corresponding to the PDSCH muting pattern in the DCI to generate a downlink control signal in the second-method 1, and includes bits corresponding to the information of the CoMP cell in the DCI to generate a downlink control signal in the third method-1. Further, the downlink control signal generating section 215 includes the bitmap indicative of subcarrier positions on the CRS multiplexing pattern in the DCI to generate a downlink control signal in the first method-2, includes bits corresponding to the CRS multiplexing pattern in the DCI to generate a downlink control signal in the second-method 2, and includes bits corresponding to the information of the CoMP cell in the DCI to generate a downlink control signal in the third method-2. Furthermore, the downlink control signal generating section 215 outputs the generated downlink control signal (PDCCH signal) to the transmission/reception section 203. Meanwhile, the downlink control signal generating section 215 includes the PDSCH multiplexing starting position in the DCI to generate a downlink control signal in the fifth method.

The transmission/reception section 203 maps the CRS, DM-RS, CSI-RS and downlink control signal to resources to transmit to the mobile terminal apparatus 10 as a downlink signal. In addition, the downlink signal includes signals that are generally transmitted as a downlink signal as well as the aforementioned signals.

The radio base station apparatus 20 may transmit the information for demodulation to the mobile terminal apparatus 10 by higher-layer signaling. The radio base station apparatus 20 transmits the cell ID of the CoMP cell to the mobile terminal apparatus 10 as the information for demodulation in the third method-1 and third method-2, transmits the PDSCH muting pattern to the mobile terminal apparatus as the information for demodulation in the fourth method-1, and transmits the CRS multiplexing pattern to the mobile terminal apparatus as the information for demodulation the fourth method-2. Further, the radio base station apparatus 20 transmits the PDSCH multiplexing starting position to the mobile terminal apparatus 10 as the information for demodulation in the sixth method.

Figure 21:
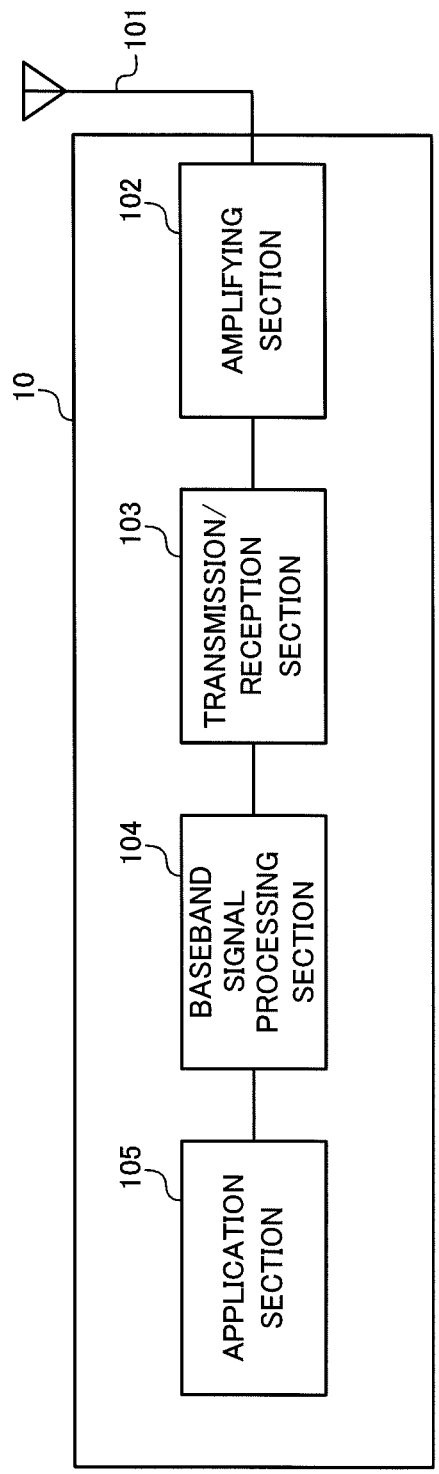
FIG. 21 is an explanatory view of an entire configuration of a mobile terminal apparatus.

Referring to FIG. 21, described next is the entire configuration of the mobile terminal apparatus according to this Embodiment. The LTE terminal and the LTE-A terminal have the same configuration of principal part of hardware, and are not distinguished to describe. The mobile terminal apparatus 10 is provided with a transmission/reception antenna 101, amplifying section 102, transmission/reception section (reception section) 103, baseband signal processing section 104 and application section 105. In applying CoMP transmission, the mobile terminal apparatus receives the information for demodulation of data signals from the serving cell, and demodulates the CoMP-received data signals using the information for demodulation.

With respect to data in downlink, a radio frequency signal received in the transmission/reception antenna 101 is amplified in the amplifying section 102, subjected to frequency conversion in the transmission/reception section 103, and is converted into a baseband signal. The baseband signal is subjected to FFT processing, error correcting decoding, reception processing of retransmission control, etc. in the baseband signal processing section 104. Among the data in downlink, the transmission data in downlink is transferred to the application section 105. The application section 105 performs processing concerning layers higher than the physical layer and MAC layer and the like. Further, among the data in downlink, the broadcast information is also transferred to the application section 105.

Meanwhile, with respect to transmission data in uplink, the application section 105 inputs the data to the baseband signal processing section 104. The baseband signal processing section 104 performs mapping processing, transmission processing of retransmission control (HARQ), channel coding, DFT processing and IFFT processing. The transmission/reception section 103 converts the frequency of the baseband signal output from the baseband signal processing section 104 into a radio frequency band. Then, the signal is amplified in the amplifying section 102, and is transmitted from the transmission/reception antenna 101.

Functional blocks of the mobile terminal apparatus 10 will be described with reference to FIG. 22. Each functional block of FIG. 22 mainly shows the processing content of the baseband processing section. Further, the functional blocks as shown in FIG. 22 are simplified to explain the present invention, and are assumed to have the configuration that is usually provided in the baseband processing section.

Figure 22:
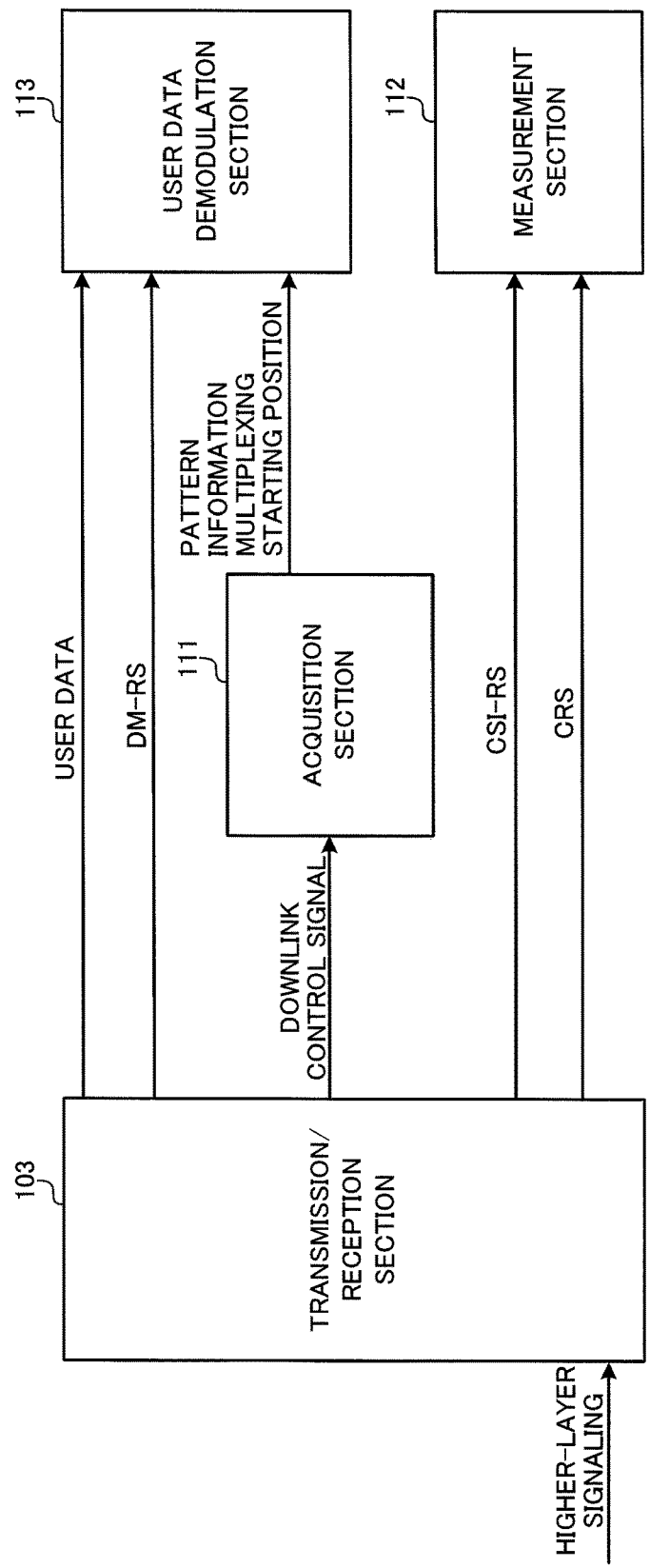
FIG. 22 is a functional block diagram corresponding to the radio communication method of the invention by the mobile terminal apparatus.

As shown in FIG. 22, the mobile terminal apparatus 10 is provided with the transmission/reception section 103, acquisition section 111, measurement section 112 and user data demodulation section 113.

The transmission/reception section 103 receives a downlink control signal (PDCCH) and the like transmitted from the radio base station apparatus 20, while receiving a data channel signal (PDSCH signal: user data). The transmission/reception section 103 outputs the downlink control signal and higher-layer signaled control information to the acquisition section 111. Further, the transmission/reception section 103 outputs the user data and DM-RS to the user data demodulation section 113, while outputting the CRS and CSI-RS to the measurement section 112.

The acquisition section 111 analyzes the downlink control signal received in the transmission/reception section 103 to acquire the information for demodulation. In the first method-1, the acquisition section 111 has the table as shown in FIG. 4. Then, the acquisition section 111 refers to the table as shown in FIG. 4, and obtains the muting pattern from the bitmap indicative of subcarrier positions on the PDSCH muting pattern included in the DCI of the downlink control signal. In the first method-2, the acquisition section 111 has the table as shown in FIG. 6. Then, the acquisition section 111 refers to the table as shown in FIG. 6, and obtains the CRS multiplexing pattern from the bitmap indicative of subcarrier positions on the CRS multiplexing pattern included in the DCI of the downlink control signal.

In the second method-1, the acquisition section 111 has the table as shown in FIG. 8. Then, the acquisition section 111 refers to the table as shown in FIG. 8, and obtains the PDSCH muting pattern included in the DCI of the downlink control signal. In the second method-2, the acquisition section 111 has the table as shown in FIG. 10. Then, the acquisition section 111 refers to the table as shown in FIG. 10, and obtains the CRS multiplexing pattern included in the DCI of the downlink control signal.

In the third method-1, the acquisition section 111 has the table as shown in FIG. 12. Then, the acquisition section 111 refers to the table as shown in FIG. 12, and acquires the information (information on the cell for muting) of the CoMP cell on the PDSCH muting pattern. Meanwhile, the acquisition section 111 has acquired the CoMP cell ID number transmitted by higher-layer signaling, calculates a shift amount of the CRS from the information of the CoMP cell and the CoMP cell ID number, and based on the shift amount, obtains the PDSCH muting pattern. Accordingly, in the third method-1, the acquisition section 111 constitutes a pattern generating section that generates a muting pattern. In the third method-2, the acquisition section 111 has the table as shown in FIG. 13. Then, the acquisition section 111 refers to the table as shown in FIG. 13, and acquires the information (information on the cell of the CRS multiplexing pattern) of the CoMP cell on the CRS multiplexing pattern. Meanwhile, the acquisition section 111 has acquired the CoMP cell ID number transmitted by higher-layer signaling, calculates a shift amount of the CRS from the information of the CoMP cell and the CoMP cell ID number, and based on the shift amount, obtains the CRS multiplexing pattern. Accordingly, in the third method-2, the acquisition section 111 constitutes a pattern generating section that generates a CRS multiplexing pattern.

In the fourth method-1, the acquisition section 111 acquires the PDSCH muting pattern transmitted by higher-layer signaling (semi-static). Further, in the case of notifying of the PDSCH muting pattern statically, the acquisition section 111 acquires the PDSCH muting pattern as shown in FIG. 14 transmitted from the radio base station apparatus at the time of starting communications or the like. In the fourth method-2, the acquisition section 111 acquires the CRS multiplexing pattern transmitted by higher-layer signaling (semi-static). Further, in the case of notifying of the CRS multiplexing pattern statically, the acquisition section 111 acquires the CRS multiplexing pattern as shown in FIG. 14 transmitted from the radio base station apparatus at the time of starting communications or the like.

In the fifth method, the acquisition section 111 has the table as shown in FIG. 16. Then, the acquisition section 111 refers to the table as shown in FIG. 16, and obtains the PDSCH multiplexing starting position included in the DCI of the downlink control signal.

In the sixth method, the acquisition section 111 acquires the PDSCH multiplexing starting position transmitted by higher-layer signaling (semi-static). Further, in the case of notifying of the PDSCH multiplexing starting position statically, the acquisition section 111 acquires the PDSCH multiplexing starting position transmitted from the radio base station apparatus at the time of starting communications or the like.

The acquisition section 111 outputs the PDSCH muting pattern, CRS multiplexing pattern or PDSCH multiplexing starting position information that is the information for demodulation to the user data demodulation section 113. The measurement section 112 specifies CSI-RS resources into which the CSI-RS is multiplexed on the resource block, and performs channel estimation using the CSI-RS.

The user data demodulation section 113 demodulates the user data received via the transmission/reception section 103. At this point, the user data demodulation section 113 demodulates the user data using the user-specific DM-RS. In the first method to fourth method, the user data demodulation section 113 uses the pattern information (PDSCH muting pattern, CRS multiplexing pattern) from the acquisition section 111, and eliminates the muting resources or CRS multiplexing positions from the target for demodulation processing to demodulate the user data. Further, in the fifth method and sixth method, the user data demodulation section 113 uses the PDSCH multiplexing starting position from the acquisition section 111, and demodulates the user data from the multiplexing starting position.

Thus, in the radio communication system according to the invention, in applying CoMP transmission, the information for demodulation of a data signal in a mobile terminal apparatus is transmitted to the mobile terminal apparatus that performs CoMP reception, the mobile terminal apparatus demodulates the CoMP-received data signal using the information for demodulation, and therefore, particularly in the case of applying JP-CoMP, it is possible to cause the mobile terminal apparatus to correctly demodulate the data signal.

Described next is a radio communication method according to the invention.

(First Method-1)

In the radio base station apparatus, the demodulation information generating section 214 generates the bitmap information indicative of subcarrier positions on the PDSCH muting pattern as the information for demodulation. Next, the downlink control signal generating section 215 includes the bitmap indicative of subcarrier positions on the PDSCH muting pattern in the DCI to generate a downlink control signal. The radio base station apparatus transmits the downlink control signal to the mobile terminal apparatus.

In the mobile terminal apparatus, the acquisition section 111 refers to the table as shown in FIG. 4, and obtains the muting pattern from the bitmap indicative of subcarrier positions on the PDSCH muting pattern included in the DCI of the downlink control signal. Next, the user data demodulation section 113 demodulates the user data using the muting pattern.
(First Method-2)

In the radio base station apparatus, the demodulation information generating section 214 generates the bitmap information indicative of subcarrier positions on the CRS multiplexing pattern as the information for demodulation. Next, the downlink control signal generating section 215 includes the bitmap indicative of subcarrier positions on the CRS multiplexing pattern in the DCI to generate a downlink control signal. The radio base station apparatus transmits the downlink control signal to the mobile terminal apparatus.

In the mobile terminal apparatus, the acquisition section 111 refers to the table as shown in FIG. 6, and obtains the CRS multiplexing pattern from the bitmap indicative of subcarrier positions on the CRS multiplexing pattern included in the DCI of the downlink control signal. Next, the user data demodulation section 113 demodulates the user data using the CFRS multiplexing pattern.
(Second Method-1)

In the radio base station apparatus, the demodulation information generating section 214 generates the PDSCH muting pattern as the information for demodulation. Next, the downlink control signal generating section 215 includes bits indicative of the PDSCH muting pattern in the DCI to generate a downlink control signal. The radio base station apparatus transmits the downlink control signal to the mobile terminal apparatus.

In the mobile terminal apparatus, the acquisition section 111 refers to the table as shown in FIG. 8, and obtains the PDSCH muting pattern included in the DCI of the downlink control signal. Next, the user data demodulation section 113 demodulates the user data using the muting pattern.
(Second Method-2)

In the radio base station apparatus, the demodulation information generating section 214 generates the CFS multiplexing pattern as the information for demodulation. Next, the downlink control signal generating section 215 includes bits indicative of the CRS multiplexing pattern in the DCI to generate a downlink control signal. The radio base station apparatus transmits the downlink control signal to the mobile terminal apparatus.

In the mobile terminal apparatus, the acquisition section 111 refers to the table as shown in FIG. 10, and obtains the CRS multiplexing pattern included in the DCI of the downlink control signal. Next, the user data demodulation section 113 demodulates the user data using the CRS multiplexing pattern.
(Third Method-1)

In the radio base station apparatus, the demodulation information generating section 214 generates the information of the CoMP cell on the PDSCH muting pattern as the information for demodulation. Next, the downlink control signal generating section 215 includes bits corresponding to the information of the CoMP cell in the DCI to generate a downlink control signal. The radio base station apparatus transmits the downlink control signal to the mobile terminal apparatus. Further, the radio base station apparatus transmits the cell ID of the CoMP cell to the mobile terminal apparatus as the information for demodulation by higher-layer signaling.

In the mobile terminal apparatus, the acquisition section 111 refers to the table as shown in FIG. 12, and obtains the information (information on the cell for muting) of the CoMP cell on the PDSCH muting pattern. Meanwhile, the acquisition section 111 has acquired the CoMP cell ID number transmitted by higher-layer signaling, calculates a shift amount of the CRS from the information of the CoMP cell and the CoMP cell ID number, and based on the shift amount, obtains the PDSCH muting pattern. Next, the user data demodulation section 113 demodulates the user data using the muting pattern.
(Third Method-2)

In the radio base station apparatus, the demodulation information generating section 214 generates the information of the CoMP cell on the CRS multiplexing pattern as the information for demodulation. Next, the downlink control signal generating section 215 includes bits corresponding to the information of the CoMP cell in the DCI to generate a downlink control signal. The radio base station apparatus transmits the downlink control signal to the mobile terminal apparatus. Further, the radio base station apparatus transmits the cell ID of the CoMP cell to the mobile terminal apparatus as the information for demodulation by higher-layer signaling.

In the mobile terminal apparatus, the acquisition section 111 refers to the table as shown in FIG. 13, and obtains the information (information on the cell for the CRS multiplexing pattern) of the CoMP cell on the CRS multiplexing pattern. Meanwhile, the acquisition section 111 has acquired the CoMP cell ID number transmitted by higher-layer signaling, calculates a shift amount of the CRS from the information of the CoMP cell and the CoMP cell ID number, and based on the shift amount, obtains the CRS multiplexing pattern. Next, the user data demodulation section 113 demodulates the user data using the CRS multiplexing pattern.
(Fourth Method-1)

The radio base station apparatus transmits the PDSCH muting pattern to the mobile terminal apparatus as the information for demodulation by higher-layer signaling (semi-static). Further, in the case of notifying of the PDSCH muting pattern statically, the radio base station apparatus transmits the PDSCH muting pattern as shown in FIG. 14 to the mobile terminal apparatus at the time of starting communications or the like.

In the mobile terminal apparatus, the acquisition section 111 acquires the PDSCH muting pattern transmitted by higher-layer signaling (semi-static). Next, the user data demodulation section 113 demodulates the user data using the muting pattern. Further, in the case of notifying of the PDSCH muting pattern statically, the acquisition section 111 demodulates the user data using the PDSCH muting pattern as shown in FIG. 14 transmitted at the time of starting communications or the like.
(Fourth Method-2)

The radio base station apparatus transmits the CRS multiplexing pattern to the mobile terminal apparatus as the information for demodulation by higher-layer signaling (semi-static). Further, in the case of notifying of the CRS multiplexing pattern statically, the radio base station apparatus transmits the CRS multiplexing pattern as shown in FIG. 14 to the mobile terminal apparatus at the time of starting communications or the like.

In the mobile terminal apparatus, the acquisition section 111 acquires the CRS multiplexing pattern transmitted by higher-layer signaling (semi-static). Next, the user data demodulation section 113 demodulates the user data using the CRS multiplexing pattern. Further, in the case of notifying of the CRS multiplexing pattern statically, the acquisition section 111 demodulates the user data using the CRS multiplexing pattern as shown in FIG. 14 transmitted at the time of starting communications or the like.

(Fifth Method)

In the radio base station apparatus, the demodulation information generating section 214 generates the PDSCH multiplexing starting position information as the information for demodulation. Next, the downlink control signal generating section 215 includes bits indicative of the PDSCH multiplexing starting position in the DCI to generate a downlink control signal. The radio base station apparatus transmits the downlink control signal to the mobile terminal apparatus.

In the mobile terminal apparatus, the acquisition section 111 refers to the table as shown in FIG. 16, and obtains the PDSCH multiplexing starting position included in the DCI of the downlink control signal. Next, the user data demodulation section 113 demodulates the user data using the PDSCH multiplexing starting position.

(Sixth Method)

The radio base station apparatus transmits the PDSCH multiplexing starting position to the mobile terminal apparatus as the information for demodulation by higher-layer signaling (semi-static). Further, in the case of notifying of the PDSCH multiplexing starting position statically, the radio base station apparatus transmits the PDSCH multiplexing starting position to the mobile terminal apparatus at the time of starting communications or the like.

In the mobile terminal apparatus, the acquisition section 111 acquires the PDSCH multiplexing starting position transmitted by higher-layer signaling (semi-static). Next, the user data demodulation section 113 demodulates the user data using the PDSCH multiplexing starting position. Further, in the case of notifying of the PDSCH multiplexing starting position statically, the acquisition section 111 demodulates the user data using the PDSCH multiplexing starting position transmitted at the time of starting communications or the like.

The above-mentioned Embodiment describes the case of including the information for demodulation in the DCI of the downlink control signal, but the present invention is not limited thereto, and is applicable similarly also in the case of including the information for demodulation in other channel signals to notify.

In the above-mentioned descriptions, the present invention is specifically described using the above-mentioned Embodiment, but it is obvious to a person skilled in the art that the invention is not limited to the Embodiment described in the Description. The invention is capable of being carried into practice as modified and changed aspects without departing from the subject matter and scope of the invention defined by the descriptions of the scope of the claims. Accordingly, the descriptions of the Description are intended for illustrative explanation, and do not have any restrictive meaning to the invention.

The present application is based on Japanese Patent Application No. 2011-103071 filed on May 2, 2011, entire content of which is expressly incorporated by reference herein.

The invention claimed is:

1. A radio base station apparatus comprising:
a processor that, in applying Coordinated Multi-Point (CoMP) transmission, generates information for demodulation of a data signal in a mobile terminal apparatus; and
a transmitter that transmits the information for demodulation to the mobile terminal apparatus that performs Coordinated Multi-Point reception,
wherein the transmitter includes information for demodulation in downlink control information (DCI) and transmits the DCI on PDCCH,
wherein the information for demodulation includes information on a frequency shift of a cell-specific reference signal (CRS) of each cell and information on a multiplexing starting position of a physical downlink shared channel (PDSCH) signal of the cell, and
wherein the information for demodulation corresponds to one or more PDCCH symbol lengths and the PDCCH symbol length for each cell of the plurality of cells is configured respectively based on the information for demodulation.

2. The radio base station apparatus according to claim 1, wherein the frequency shift of the CRS is associated with bits included in the DCI.

3. The radio base station apparatus according to claim 2, wherein the frequency shift is used to define a multiplexing position of the CRS.

4. The radio base station apparatus according to claim 1, wherein the multiplexing starting position of the PDSCH signal is associated with bits included in the DCI.

5. The radio base station apparatus according to claim 1, wherein the DCI is associated with cell identification information of the CoMP cell having a possibility of applying Coordinated Multi-Point transmission, and the information on the frequency shift is notified with the cell identification information of the CoMP cell transmitted by higher-layer signaling and the DCI corresponding to information of the CoMP cell.

6. The radio base station apparatus according to claim 1, wherein the information on the frequency shift of the CRS and/or the information on the multiplexing starting position of the PDSCH signal is notified by higher-layer signaling.

7. The radio base station apparatus according to claim 1, wherein the multiplexing starting position of the PDSCH is used as the information for demodulation, and the PDCCH symbol length for the plurality of cells is configured respectively for each cell.

8. A mobile terminal apparatus comprising:
a receiver that receives information for demodulation of a data signal from a serving cell in applying Coordinated Multi-Point transmission; and
a demodulator that demodulates the data signal subjected to Coordinated Multi-Point reception using the information for demodulation,
wherein the receiver receives information for demodulation transmitted on PDCCH,
wherein the information for demodulation is downlink control information (DCI) and includes information on a frequency shift of a cell-specific reference signal (CRS) of each cell and information on a multiplexing starting position of a physical downlink shared channel (PDSCH) signal of the cell, and
wherein the information for demodulation corresponds to one or more PDCCH symbol lengths, and the PDCCH symbol length for each cell of the plurality of cells is configured respectively based on the information for demodulation.

9. The mobile terminal apparatus according to claim 8, further comprising:
a table in which the frequency shift of the CRS is associated with bits included in the DCI,
wherein the demodulator recognizes the frequency shift of the CRS from the bits notified by the DCI to demodulate the data signal.

10. The mobile terminal apparatus according to claim 8, further comprising:
   a table in which the multiplexing starting position of the PDSCH signal is associated with bits included in the DCI,
   wherein the demodulator recognizes the multiplexing starting position of the PDSCH signal from the bits notified by the DCI to demodulate the data signal.

11. A radio communication method comprising:
   in a radio base station apparatus:
      generating information for demodulation of a data signal in a mobile terminal apparatus by applying Coordinated Multi-Point (CoMP) transmission; and
      transmitting the information for demodulation to the mobile terminal apparatus that performs Coordinated Multi-Point reception; and
   in the mobile terminal apparatus:
      receiving the information for demodulation of the data signal; and
      demodulating the data signal subjected to Coordinated Multi-Point reception using the information for demodulation;
   wherein the radio base station apparatus includes information for demodulation in downlink control information (DCI) and transmits the DCI on PDCCH,
   wherein the information for demodulation includes information on a frequency shift of a cell-specific reference signal (CRS) of each cell and information on a multiplexing starting position of a physical downlink shared channel (PDSCH) signal of the cell, and
   wherein the information for demodulation corresponds to one or more PDCCH symbol lengths and the PDCCH symbol length for each cell of the plurality of cells is configured respectively based on the information for demodulation.

12. A radio communication system comprising:
   a radio base station apparatus having a processor that generates information for demodulation of a data signal in a mobile terminal apparatus in applying Coordinated Multi-Point (CoMP) transmission, and a transmitter that transmits the information for demodulation to the mobile terminal apparatus that performs Coordinated Multi-Point reception; and
   the mobile terminal apparatus having a receiver that receives the information for demodulation of a data signal, and a demodulator that demodulates the data signal subjected to Coordinated Multi-Point reception using the information for demodulation,
   wherein the transmitter includes information for demodulation in downlink control information (DCI) and transmits the DCI on PDCCH,
   wherein the information for demodulation includes information on a frequency shift of a cell-specific reference signal (CRS) of each cell and information on a multiplexing starting position of a physical downlink shared channel (PDSCH) signal of the cell, and
   wherein the information for demodulation corresponds to one or more PDCCH symbol lengths and the PDCCH symbol length for each cell of the plurality of cells is configured respectively based on the information for demodulation.

* * * * *